(12) United States Patent
Matsumoto et al.

(10) Patent No.: US 8,410,223 B2
(45) Date of Patent: Apr. 2, 2013

(54) PRODUCTION METHOD FOR WATER-ABSORBING RESIN

(75) Inventors: Koji Matsumoto, Himeji (JP); Kozo Nogi, Himeji (JP); Kunihiko Ishizaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 163 days.

(21) Appl. No.: 12/934,808

(22) PCT Filed: Mar. 26, 2009

(86) PCT No.: PCT/JP2009/056157
§ 371 (c)(1),
(2), (4) Date: Sep. 27, 2010

(87) PCT Pub. No.: WO2009/119754
PCT Pub. Date: Oct. 1, 2009

(65) Prior Publication Data
US 2011/0028670 A1     Feb. 3, 2011

(30) Foreign Application Priority Data

Mar. 28, 2008 (JP) .................................. 2008-086570
Apr. 28, 2008 (JP) .................................. 2008-117167
Sep. 22, 2008 (JP) .................................. 2008-242697

(51) Int. Cl.
*C08F 120/06* (2006.01)
*C08F 220/06* (2006.01)
*C08J 3/24* (2006.01)
*B65G 53/04* (2006.01)

(52) U.S. Cl. ............... 525/330.2; 525/329.7; 525/330.1; 526/317.1; 524/556

(58) Field of Classification Search ............... 525/329.7, 525/330.1, 330.2; 526/317.1; 524/556
See application file for complete search history.

(56) References Cited

U.S. PATENT DOCUMENTS 4,985,518 A    1/1991 Alexander et al.
6,716,894 B2    4/2004 Kajikawa et al.
6,727,345 B2    4/2004 Kajikawa et al.
6,817,557 B2    11/2004 Kakita et al.
7,098,284 B2    8/2006 Torii et al.
7,193,006 B2    3/2007 Ishizaki et al.
7,402,643 B2    7/2008 Torii et al.
7,638,570 B2    12/2009 Torii et al.
2005/0288182 A1    12/2005 Torii et al.
2006/0073969 A1    4/2006 Torii et al.
2007/0106013 A1    5/2007 Adachi et al.
2009/0060660 A1    3/2009 Funk et al.
2009/0060661 A1 *    3/2009 Feise et al. ................ 406/197
2010/0041550 A1    2/2010 Riegel et al.

FOREIGN PATENT DOCUMENTS

| EP | 0512782 | 11/1992 |
|---|---|---|
| JP | 2001-270948 | 10/2001 |
| JP | 2004-043102 | 2/2004 |
| JP | 2004-345804 | 12/2004 |
| WO | 2007/075634 | 7/2007 |
| WO | 2007/104657 | 9/2007 |
| WO | WO 2007/104676 | 9/2007 |
| WO | WO 2007104657 A2 * | 9/2007 |
| WO | WO 2008/092842 | 8/2008 |
| WO | 2008/123149 | 10/2008 |
| WO | WO 2008/123149 | 10/2008 |

* cited by examiner

*Primary Examiner* — Roberto Rabago
(74) *Attorney, Agent, or Firm* — Occhiuti Rohlicek Tsao LLP

(57) ABSTRACT

There is provided a production method for a water-absorbing resin for stably and continuously producing the water-absorbing resin with industrially high property, in particular, the water-absorbing resin with high liquid permeation. A method of the present invention relates to a production method for a water-absorbing resin including: a polymerization step of an aqueous solution of an unsaturated monomer; a drying step of the resultant hydrogel polymer; and a surface cross-linking step after drying; characterized by including a pneumatic transportation step for pneumatic transporting the water-absorbing resin powder substance in a pipeline with a surface roughness (Rz) of the inner surface of equal to or smaller than 800 nm, by using gas with a dew point of −5° C. to −100° C.

14 Claims, 5 Drawing Sheets

PRODUCTION METHOD FOR WATER-ABSORBING RESIN

CROSS REFERENCE TO RELATED APPLICATIONS

This application is a National Stage of International Application No. PCT/JP2009/056157, filed on Mar. 26, 2009, which claims the priority of Japanese Application No. 2008-086570 filed Mar. 28, 2008, Japanese Application No. 2008-117167 filed Apr. 28, 2008, Japanese Application No. 2008-242697 filed Sep. 22, 2008. The content of the prior application mentioned above is incorporated herein by reference in its entirety.

TECHNICAL FIELD

The present invention relates to a production method for a water-absorbing resin.

BACKGROUND ART

In recent years, in hygiene products such as disposable diapers, sanitary napkins and incontinent pads, the water-absorbing resin as a composition material thereof has been widely used, in view of absorbing a body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer and a cross-linked product thereof, and a cross-linked product of a cationic monomer and the like. This water-absorbing resin may be used after converted to also a sheet-like, fiber-like or film-like form, and however, it is generally used after converted to a powder-like form (particulate). As such powders (particles), for example, the particulate water-absorbing agent, having a weight average particle diameter thereof of about 200 to 800 μm, is used widely.

The particulate water-absorbing agent is produced via the polymerization step, the drying step, the crushing step, the classification step, the surface cross-linking step, and the like (Patent Documents 1 to 4). In an industrial scale production, a transportation apparatus is used for connecting each step (Patent Document 5). As a transportation system of the water-absorbing resin, mechanical transportation and pneumatic transportation are included (Patent Documents 6 to 9). In mechanical transportation, for example, a conveyor (a belt conveyor, a bucket conveyor, a screw conveyor) is used as the transportation apparatus.

In addition, in recent years, higher property has been required to such a water-absorbing resin, and as a result, to enhance property of the highly water-absorbing resin, for example, to enhance liquid permeation, technologies (Patent Documents 12 to 17) for using various additives (for example, a polyvalent metal salt, a water-insoluble fine particle) to the water-absorbing resin have been proposed.

PRIOR DOCUMENTS

Patent Documents

Patent Document 1: U.S. Pat. No. 6,727,345 specification
Patent Document 2: U.S. Pat. No. 7,193,006 specification
Patent Document 3: U.S. Pat. No. 6,716,894 specification
Patent Document 4: U.S. Pat. No. 4,985,518 specification
Patent Document 5: U.S. Pat. No. 6,817,557 specification
Patent Document 6: JP-A-2004-43102
Patent Document 7: WO 2007/104657 pamphlet
Patent Document 8: WO 2007/104673 pamphlet
Patent Document 9: WO 2007/104676 pamphlet
Patent Document 10: US-A-2006/0204755 specification
Patent Document 11: US-A-2006/0073969 specification
Patent Document 12: U.S. Pat. No. 7,098,284 specification
Patent Document 13: US-A-2005/0288182 specification
Patent Document 14: US-A-2005/0070671 specification
Patent Document 15: US-A-2007/0106013 specification
Patent Document 16: WO 2008/092842 pamphlet
Patent Document 17: WO 2008/092843 pamphlet

DISCLOSURE OF THE INVENTION

Problem to be Solved by the Invention

In a method for enhancing property of the water-absorbing resin, technologies described in the Patent Documents 10 to 17 show a certain effect (enhancement of liquid permeation) in a laboratory, but, when such technologies are scaled-up industrially, for example, scaled-up to annual production of equal to or higher than 1000 ton, in particular, equal to or higher than 10000 ton per one line, there was often the case of not providing such high property as in the laboratory.

Accordingly, it is an object of the present invention to produce stably and continuously the water-absorbing resin with industrially high property, in particular, the water-absorbing resin with high liquid permeation.

Among these, in the particulate water-absorbing agent containing an liquid permeation improver such as the polyvalent metal salt or the water-insoluble fine particle and the production method therefor, the present inventors have discovered a particular problem, that is, a problem of decrease in transportation property (decrease in productivity) accompanying with use of the liquid permeation improver, and decrease in property accompanying with transportation after mixing the liquid permeation improver. In particular, in the production step for the water-absorbing resin, many carrying machines (for example, a belt conveyor, a screw conveyor, a bucket conveyor or the like) for connecting between the steps are used in midway, in various ways, and it was discovered that decrease in transportation property and decrease in property accompanying with use of the liquid permeation improver are an obvious and particular problem in pneumatic transportation.

Means for Solving the Problem

In order to solve the problems, the production method for the water-absorbing resin of the present invention includes: a polymerization step for polymerizing an aqueous solution of an unsaturated monomer to obtain a hydrogel polymer; a drying step for drying the hydrogel polymer to obtain a particulate water-absorbing resin; and a surface cross-linking step for surface cross-linking the particulate water-absorbing resin In addition, it is characterized by including a pneumatic transportation step for pneumatic transporting a water-absorbing resin powder substance generated in each step in a pipeline with a surface roughness (Rz) of the inner surface of equal to or smaller than 800 nm, by using gas with a dew point of −5° C. to −100° C.

ADVANTAGES OF THE INVENTION

According to the present invention, the water-absorbing resin with industrially high property, in particular, the water-absorbing resin with high liquid permeation can be produced stably and continuously, by passing a specified pneumatic transportation step.

MODE FOR CARRYING OUT THE INVENTION

Figure 1:
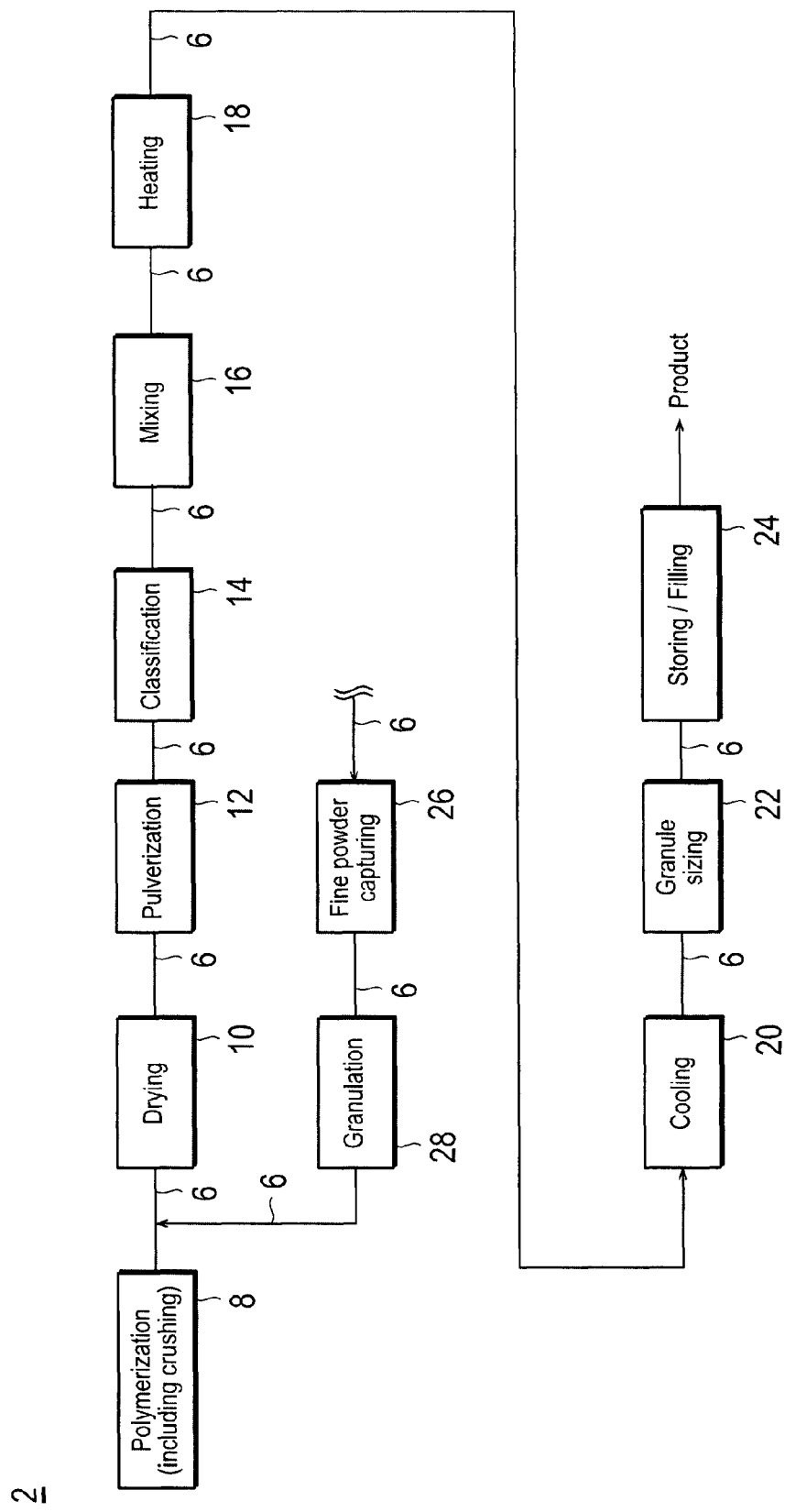
FIG. 1 is a schematic configuration view showing a production apparatus to be used to produce the particulate water-absorbing agent.

The present invention relates to a production method for the water-absorbing resin. In the present description, the "water-absorbing resin" means a water swelling and water-insoluble polymer gelling agent. Absorbency (CRC) is essentially equal to or higher than 5 g/g, preferably 10 to 100 g/g, and still more 20 to 80 g/g. In addition, soluble components (Extractables) are essentially 0 to 50% by weight, preferably 0 to 30% by weight, still more preferably 0 to 20% by weight, and particularly preferably 0 to 10% by weight.

It should be noted that, the water-absorbing resin is not limited to a form where whole amount (100%) is a polymer, and may include additives (to be described later or the like), in a range to maintain the performance. That is, even for a particulate water-absorbing agent (a water-absorbing resin composition), it is called generically the water-absorbing resin in the present invention. In the present invention, when the water-absorbing resin is the particulate water-absorbing agent (the water-absorbing resin composition), content of the water-absorbing resin relevant to the present invention (a polyacrylic acid (salt)-based water-absorbing resin) is preferably 70 to 99.9% by weight, more preferably 80 to 99.7% by weight, and still more preferably 90 to 99.5% by weight, relative to total amount. As components other than the water-absorbing resin, in view of water absorbing speed or impact resistance of the powders (particles), water is preferable, and the additives to be described later are contained as needed.

In the present description, the "polyacrylic acid (salt)" means a polymer composed principally of acrylic acid (salt), as a repeating unit. Specifically, it means a polymer containing acrylic acid (salt) of essentially 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, preferably a monovalent salt, more preferably an alkali metal salt or an ammonium salt, particularly preferably an alkali metal salt, still more preferably a sodium salt.

"EDANA" is an abbreviation of European Disposables and Nonwovens Association. As for detail of the European standard (nearly a world standard) measurement method (ERT/ EDANA Recommended Test Methods) for the water-absorbing resin, refer to known document (revised in 2002) as the ERT original.

In the present description, a "hydrogel polymer (water-containing gel)", a "dried substance" and the "water-absorbing resin powder substance (a powder substance)" are defined as follows.

The "hydrogel polymer (water-containing gel)" indicates a hydrogel cross-linked polymer of the water-absorbing resin. As a representative, it means water-containing gel obtained in a polymerization step. Usually it indicates a polymer having a moisture content of equal to or higher than 30% by weight.

The "dried substance" indicates a dried polymer of the water-absorbing resin after a drying step. It usually indicates a dried polymer having moisture content in the drying step of below 30% by weight, and still more equal to or lower than 20% by weight, although it depends on the moisture content after polymerization. Shape thereof is not limited and drying may be performed at the same time as polymerization (drying by polymerization heat or by heating during polymerization, etc.).

The "water-absorbing resin powder substance (a powder substance)" means a solid having a certain fluidity as powders, and for example, it means the state in which Flow Rate (ERT450.2-02) can be measured as fluidity, or a solid which can be sieve classified by (ERT420.2-02). More specifically, it is a solid of a particle diameter of equal to or smaller than 5 mm, specified by sieve classification, and it means powder substance of dried polymer of the water-absorbing resin, or powder substance to be used as a solid as it is among raw materials or the additives of the water-absorbing resin (for example, water-insoluble inorganic powders, polyvalent metal salt powders or hydrate salts thereof and the like). Moisture content is not limited as long as it is a solid, and it is usually below 30% by weight, and still more equal to or lower than 20% by weight. The lower limit of particle diameter is not especially limited, and, for example, equal to or larger than 1 nm. It should be noted that, in general, there may be the case where those of equal to or larger than 1 mm are called particles, and those of below 1 mm are called powder substances, but, in the present invention, these powder particle substances (the water-absorbing resin or raw materials thereof) are collectively referred to as "a powder substance". In addition, in the present description, "the powder substance" and "powder" are treated as synonyms.

Firstly, explanation will be given on outline of the production step of the particulate water-absorbing agent (the water-absorbing resin) relevant to the present invention, and then on the transportation method of the present invention.

[The Whole Step (FIG. 1)]

FIG. 1 is a schematic configuration view showing a production facility 2 to be used to produce the water-absorbing resin (the particulate water-absorbing agent). In this production facility 2, apparatuses for performing each step are connected by transportation parts 6. A polymerization apparatus 8, a drying apparatus 10, a pulverization apparatus 12, a classification apparatus 14, a mixing apparatus 16, a heating apparatus 18, a cooling apparatus 20, a granule sizing apparatus 22, a filling apparatus 24, a fine powder capturing apparatus 26, and a granulation apparatus 28 are installed in this production facility 2. The water-absorbing resin powder substance obtained in a certain step is transported to the next step by the transportation part 6.

The polymerization step is performed using the polymerization apparatus 8. The drying step is performed using the drying apparatus 10. The pulverization step is performed using the pulverization apparatus 12. The classification step is performed using the classification apparatus 14. The surface cross-linking step is performed using the mixing apparatus 16 and the heating apparatus 18. The cooling step is performed using the cooling apparatus 20. The granule sizing step is performed using the granule sizing apparatus 22. The packaging step is performed using the filling apparatus 24. The fine powders are collected using the fine powder capturing apparatus 26. The granulation step is performed using the granulation apparatus 28. The fine powders collected, or granulated particles granulated in the granulation step are recycled by a fine-powder recycling step.

[The Polymerization Step]

The polymerization step is the step for polymerizing a monomer, which can become the water-absorbing resin by polymerization (hereafter may also be referred to as "a monomer"), to generate a polymer gel (a hydrogel polymer). A polymerization method for the water-absorbing resin relevant to the present invention is not especially limited, and for example, bulk polymerization, precipitation polymerization, aqueous solution polymerization, reversed phase suspension polymerization, spraying polymerization, liquid droplet polymerization, or the like is included. In view of performance and easiness of polymerization control, aqueous solution polymerization or reversed phase suspension polymerization where the monomer is used as an aqueous solution are preferable.

In the present invention, aqueous solution polymerization, in particular, continuous aqueous solution polymerization is preferable, which is significant in solving a problem of carrying property, in view of shape of the resultant polymer gel. In continuous aqueous solution polymerization, in view of exerting more effect of the present invention, continuous belt polymerization or continuous kneader polymerization may be used suitably. As preferable continuous polymerization, continuous kneader polymerization (for example, U.S. Pat. No. 6,987,151 specification, U.S. Pat. No. 6,710,141 specification) and continuous belt polymerization (for example, U.S. Pat. Nos. 4,893,999, 6,241,928, US-A-2005-215734) are included. In such continuous polymerization, the water-absorbing resin can be produced in high productivity, and however, it tends to provide deflection of or decrease in property accompanying with scale-up, but the present invention is capable of solving also such a problem.

(A Monomer)

The monomer is not especially limited, and, for example, a water-soluble unsaturated monomer shown below is included: for example, an anionic unsaturated monomer such as (meth) acrylic acid, maleic acid (anhydride), itaconic acid, cynamiic acid, vinyl sulfonic acid, allyltoluene sulfonic acid, vinyltoluene sulfonic acid, styrene sulfonic acid, 2-(meth) acrylamido-2-methylpropane sulfonic acid, 2-(meth)acryloylethane sulfonic acid, 2-(meth)acryloylpropane sulfonic acid, 2-hydroxyethyl (meth)acryloyl phosphate, and a salt thereof; a mercapto group-containing unsaturated monomer; a phenolic hydroxy group-containing unsaturated monomer; an amide group-containing unsaturated monomer such as (meth) acrylamide, N-ethyl(meth)acrylamide, N,N-dimethyl (meth)acrylamide; an amino group-containing unsaturated monomer such as N,N-dimethylaminoethyl (meth)acrylate, N,N-dimethylaminopropyl (meth)acrylate, N,N-dimethylaminopropyl (meth)acrylamide, or the like. These monomers may be used alone or two or more kinds may be used in combination as appropriate. These monomers may contain iron or a polymerization inhibitor in an amount of equal to or less than 5 ppm, and still more preferably equal to or less than 1 ppm, and preferable use amount is, for example, methoxy phenols of equal to or less than 160 ppm by weight, which is use amount exemplified in U.S. Pat. No. 7,049,366.

Among them, in view of performance and cost of the resulting water-absorbing resin, it is preferable to be a polyacrylic acid (salt)-based water-absorbing resin using, as a principal component, an anionic unsaturated monomer, particularly preferably, an unsaturated monomer containing a carboxyl group, and still more preferably acrylic acid and/or a salt thereof (for example, a salt of sodium, lithium, potassium, ammonium, amines or the like, and among these the sodium salt is preferable in view of cost). Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole (the upper limit is 100% by mole), relative to total monomer components (excluding an internal cross-linking agent to be described later). It should be noted that, when the monomer is an acid group-containing monomer such as a carboxyl group, neutralization rate thereof is not especially limited, and the polymer gel may be neutralized after polymerization, as needed. In applications where there may be contact to a human body, such as hygiene goods, neutralization after polymerization is not necessary. This neutralization rate is preferably from 40% by mole to 90% by mole, and more preferably from 50% by mole to 80% by mole.

When the above-described monomer is used as an aqueous solution in the polymerization step, concentration of the monomer in this aqueous solution (hereafter may also be referred to as "a monomer solution") is not especially limited, and it is preferably within a range of 10 to 70% by weight, and more preferably within a range of 20 to 60% by weight, and still more preferably 35 to 60% by weight. In addition, when the aqueous solution polymerization or reversed phase suspension polymerization is performed, a solvent other than water may be used in combination, as needed. It should be noted that, kind of the solvent to be used in combination is not especially limited.

(A Polymerization Initiator)

In the polymerization step, for example, a radical polymerization initiator may be used. This radical polymerization initiator is not especially limited, and one or more kinds may be selected and used from those utilized in usual polymerization of the water-absorbing resin, depending on kind of the monomer to be polymerized, polymerization conditions and the like.

For example, a thermal decomposition-type initiator (for example, a persulfate such as sodium persulfate, potassium persulfate, ammonium persulfate; a peroxide such as hydrogen peroxide, t-butylperoxide, methyl ethyl ketone peroxide; an azo compound such as an azonitrile compound, an azoamidine compound, a cyclic azoamidine compound, an azoamide compound, an alkylazo compound, 2,2'-azobis(2-amidinopropane)dihydrochloride, 2,2'-azobis[2-(2-imidazoline-2-yl)propane]dihydrochloride; and the like), or a photodecomposition-type initiator (for example, a benzoin derivative, a benzyl derivative, an acetophenone derivative, a benzophenone derivative, an azo compound or the like); and the like may be included. Among these, in view of cost and reduction capability of residual monomer, the thermal decomposition type initiator is preferable, and a persulfate salt is particularly preferable. In addition, because combined use of a reducing agent can promote decomposition of the radical polymerization initiator, it is possible to make a redox-type initiator by combining both. The reducing agent is not especially limited, and, for example, (bi)sulfurous acid (salt) such as sodium sulfite, sodium hydrogen sulfite, L-ascorbic acid (salt), a reductive metal (salt) such as ferrous salt or the like; amines or the like is included.

Use amount of the radical polymerization initiator to be used in the polymerization step is not especially limited, and, in view of a residual monomer or water-soluble amount, usually 0.001 to 2% by weight is preferable, 0.01 to 1% by weight is more preferable, 0.01 to 0.5% by weight is still more preferable, and 0.01 to 0.05% by weight is particularly preferable relative to use amount of the monomer. The use amount of the radical polymerization initiator of below 0.001% by weight, relative to use amount of this monomer, increases the unreacted monomer, and increases amount of the residual monomers in the resultant water-absorbing resin, and is thus not preferable. On the other hand, this use amount of over 2% by weight increases water-soluble components in the resultant water-absorbing resin, and is thus not preferable. It should be noted that, in this polymerization step, instead of the above-described radical polymerization initiator, the monomer may be polymerized by irradiation of activated energy rays such as radiation rays, electron beams, UV rays.

(An Internal Cross-Linking Agent)

In the polymerization step, the internal cross-linking agent may be used, as needed. As the internal cross-linking agent, a conventionally known internal cross-linking agent, having two or more polymerizable unsaturated groups or two or more reactive groups, in one molecule, is included. Specifically, for example, N,N'-methylenebis(meth)acrylamide, (poly)ethylene glycol di(meth)acrylate, (poly)propylene glycol di(meth) acrylate, trimethylolpropane tri(meth)acrylate, glycerin tri (meth)acrylate, glycerin acrylate methacrylate, ethylene oxide modified trimethylolpropane tri(meth)acrylate, pentaerythritol hexa(meth)acrylate, triallyl cyanurate, triallyl isocyanurate, triallyl phosphate, triallyl amine, polyallyloxy alkane, (poly)ethylene glycol diglycidyl ether, glecerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, glycidyl(meth)acrylate or the like is include. Among these, in consideration of reactivity, one or more kinds may be used. In particular, as the internal cross-linking agent, a compound having two or more polymerizable unsaturated groups is preferable. Use amount of the internal cross-linking agent may be determined as appropriate depending on desired property of the water-absorbing resin, and, usually use amount of the internal cross-linking agent is preferably in a range of 0.001 to 5% by mole, still more 0.005 to 2% by mole and particularly 0.001 to 0.5% by mole relative to the monomer. Too low use amount of the internal cross-linking agent tends to decrease strength of the polymer gel and increase soluble content, on the contrary, too excessively high use amount tends to decrease property such as absorbency. It should be noted that, the internal cross-linking agent may be added to a reaction system once as a whole, or may be added dividedly.

[The Drying Step]

The drying step is the step for drying the polymer gel (hydrogel polymer) obtained in the polymerization step. The polymer gel obtained in the polymerization step using aqueous solution polymerization is preferably supplied to the drying step, usually in a particulate state of about 0.1 to 5 mm, still more preferably 0.5 to 3 mm, by crushing treatment during or after polymerization. Because surface area of the gel increases by making particulate gel, the above-described drying step can proceed smoothly. The crushing means is not especially limited, and, various cutting means, for example, a meat chopper, a roller-type cutter, a guillotine cutter, a slicer, a roll cutter, a shredder, scissors, may be used alone or in combination as appropriate. A drying method in this drying step is not especially limited, and, as the drying apparatus 10, a method using a usual dryer or a heating furnace may be adopted widely. Specifically, a conductive heat transfer-type dryer, a radiation heat transfer-type dryer, a hot air heat transfer-type dryer, an inductive heating dryer, or the like is exemplified. In view of speed of drying, the hot air heat transfer-type dryer (hereafter, referred to as a hot air dryer) is preferable. As this hot air dryer, a drying apparatus such as a through-flow band-type, a through-flow circuit-type, a through-flow vertical-type, a parallel flow band-type, a through-flow tunnel-type, a through-flow groove-type stirring-type, a fluidized bed-type, an air flow-type, a spray-type is included. In view of easiness of property control of the particulate water-absorbing agent, the band-type is preferable. As drying temperature, setting at relatively high temperature is preferable, and it is specifically preferably 100 to 250° C., more preferably 120 to 220° C., and still preferably 150 to 200° C. Drying time is not especially limited, and, it may be set at the time so as to attain desirable solid content rate of the resultant dried substance. It is preferable that solid content rate of the dried substance obtained in the drying step (specified as residual amount after heating at 180° C. for 3 hours) is equal to or higher than 90% by weight, in view of easiness of pulverization. In general, in view of production efficiency, it is preferable that this drying time is usually within two hours, although it depends on particle diameter of the polymer gel, drying temperature, air volume or the like.

[The Pulverization Step]

The pulverization step is the step for pulverizing the particulate water-absorbing resin, as a dried substance of the polymer gel obtained in the polymerization step. This pulverization is usually performed for the dried substance, but, it may be performed for the polymer gel obtained in the polymerization step before drying. By this pulverization, the particulate water-absorbing resin, as a pulverized substance, can be obtained.

Pulverization is preferably performed so that the particulate water-absorbing resin with desired particle diameter (preferably, a weight average particle diameter of 200 to 800 μm) can be obtained as many as possible. A method for pulverization is not especially limited, and a conventionally known method can be adopted. As the pulverization apparatus 12 to be used in this pulverization step, a three-stage roll mill is exemplified. Because of generation of the fine powders by this pulverization, the fine powders are included in the particulate water-absorbing resin obtained in the pulverization step. It should be noted that, when particle diameter of the particulate water-absorbing resin obtained in the polymerization step or in the drying step is controlled in size and sufficiently small, it is not necessary to perform this pulverization step.

[The Classification Step]

The classification step is the step for sieving the particulate water-absorbing resin with a sieve. In this classification step, pulverized substances obtained in the above-described pulverization step are sieved. In this classification step, for example, the classification apparatus 14 having a metal mesh is used. In this classification step, by selecting particles having desired particle diameter (a weight average particle diameter (D50), specified by sieve classification, of preferably 200 to 800 μm, more preferably 300 to 600 μm), by use of this classification apparatus 14, the objective particulate water-absorbing resin can be obtained. A classification method is not especially limited and a conventionally known method can be adopted. It should be noted that, when particle diameter of the particulate water-absorbing resin obtained in the polymerization step or in the drying step is controlled in size and sufficiently small, it is not necessary to perform this classification step.

[The Surface Cross-Linking Step]

The surface cross-linking step is a step for cross-linking the particulate water-absorbing resin obtained after the drying step, preferably in the classification step. In the present description, the "surface cross-linking" means to perform cross-linking of the surface or the neighborhood of the surface of the water-absorbing resin. In the present invention, the particulate water-absorbing resin with the surface or the neighborhood of the surface thereof cross-linked is the particulate water-absorbing agent. It should be noted that, the "surface or neighborhood of the surface" indicates usually a part of the surface layer with a thickness of equal to or less than several tens μm, or a part of the surface layer with a thickness of equal to or less than 1/10 of total thickness, and, this thickness is determined as appropriate depending on objectives.

In such surface cross-linking, (1) a method for surface cross-linking of the particulate water-absorbing resin with a surface cross-linking agent to be described later (JP. No. 2530668 specification), (2) a method for cross-linking polymerization of the surface of the particulate water-absorbing resin with a cross-linkable monomer (for example, U.S. Pat. No. 7,201,941 specification), or (3) a method for surface cross-linking of the particulate water-absorbing resin with a radical initiator (as disclosed in U.S. Pat. No. 4,783,510 specification, US-A-2005/0048221 specification) or the like may be used suitably. In addition, it is preferable that the cross-linking reaction of this particulate water-absorbing resin is promoted by heating or radiation rays (preferably UV rays as disclosed in EP No. 1824910 specification).

As the surface cross-linking agent which can be used in the surface cross-linking step there are many kinds. In view of property, there is exemplified a cross-linking agent having covalent property such as a polyhydric alcohol compound, an epoxy compound, a condensate between a polyvalent amine compound and a haloepoxy compound, an oxazoline compound, a (mono-, di- or poly)oxazolidinone compound, an alkylene carbonate compound or the like; and a cross-linking agent having ion binding property such as a polyvalent amine compound, a polyvalent metal salt, or the like. Specifically, a surface cross-linking agent exemplified in U.S. Pat. No. 6,228,930 specification, U.S. Pat. No. 6,071,976 specification, U.S. Pat. No. 6,254,990 specification or the like may be used. These surface cross-linking agents are not especially limited, but, in view of enhancement of liquid permeation or absorbency against pressure, the cross-linking agent having covalent property is preferable, and the condensate between the polyvalent amine compound and the haloepoxy compound; the oxazolidinone compound such as 2-oxazolidinone (U.S. Pat. No. 6,559,239 specification); an oxetane compound; a cyclic urea compound; the alkylene carbonate compound such as ethylene carbonate or the like (U.S. Pat. No. 5,409,771 specification); or the like is included. Still more, in view of maximizing effect of the present invention, among these surface cross-linking agents, in particular, the cross-linking agents having covalent property, a surface cross-linking agent having dehydration esterification reactivity with a carboxyl group of the water-absorbing resin is preferable, specifically, at least one kind selected from the oxazolidinone compound, the alkylene carbonate compound, the polyhydric alcohol compound, the oxetane compound (US-A-2002/72471 specification) and the cyclic urea compound is preferable, and at least one kind selected from the oxazolidinone compound, the alkylene carbonate compound, the polyhydric alcohol compound with carbon atoms of 2 to 10, and the oxetane compound with carbon atoms of 2 to 10 is more preferable, and the polyhydric alcohol compound with carbon atoms of 3 to 8 such as 1,4-butanediol, propylene glycol is most preferable. As the surface cross-linking agent, the compounds exemplified above may be used alone or two or more kinds may be used in combination, but, in a liquid permeation aspect, combined use of the cross-linking agent having covalent property and the cross-linking agent having ion binding property is preferable.

As described above, it is particularly preferable that the water-absorbing resin powder substance relevant to the present invention is surface cross-linked with the polyhydric alcohol. As will be described later, the present invention is capable of suppressing an initial linear velocity Vx (linear velocity of the water-absorbing resin powder substance at the starting point of a transportation pipeline). Due to the low initial linear velocity Vx, peeling of a surface cross-linking layer, caused by mutual friction between particles, can be suppressed, and thus property enhancement effect by surface cross-linking with the polyhydric alcohol or the like is difficult to be impaired.

In the surface cross-linking step, use amount of the above-described surface cross-linking agent depends on the surface cross-linking agent selected or a combination of the surface cross-linking agents, but, use amount from 0.001 part by weight to 10 parts by weight is preferable, and from 0.01 part by weight to 5 parts by weight is more preferable, relative to 100 parts by weight of solid content of the particulate water-absorbing resin.

It should be noted that, the surface cross-linking step may be performed two or more times in consideration of effect thereof, and in that case, as the surface cross-linking agent to be used at and after the second time, the same one as that used at the first time may be used, or a surface cross-linking agent different from that used at the first time may be used.

In the surface cross-linking step, in addition to the surface cross-linking agent, an acid substance such as an organic acid (lactic acid, citric acid, p-toluenesulfonic acid) or a salt thereof, an inorganic acid (phosphoric acid, sulfuric acid, sulfurous acid) or a salt thereof; a basic substance such as sodium hydroxide or sodium carbonate; a polyvalent metal salt such as aluminum sulfate to be described later, may be used in combination, in over 0% by weight and equal to or lower than 10% by weight, further preferably over 0% by weight and equal to or lower than 5% by weight, and particularly preferably over 0% by weight and equal to or lower than 1% by weight, relative to the water-absorbing resin.

In the surface cross-linking step, it is preferable to use water as a solvent in mixing the particulate water-absorbing resin and the surface cross-linking agent. Use amount of water depends on kind of the water-absorbing resin, particle diameter and water content of the particulate water-absorbing resin or the like, but, use amount over 0 part by mass and equal to or lower than 20 parts by mass is preferable, and use amount within a range of 0.5 to 10 parts by mass is more preferable, relative to 100 parts by mass of solid content of the particulate water-absorbing resin. In addition, in mixing the particulate water-absorbing resin and the surface cross-linking agent, a hydrophilic organic solvent may be used in combination, as needed. In this case, as the hydrophilic organic solvent to be used in combination, for example, lower alcohols such as methyl alcohol, ethyl alcohol, n-propyl alcohol, isopropyl alcohol, n-butyl alcohol, isobutyl alcohol, t-butyl alcohol; ketones such as acetone; ethers such as dioxane, tetrahydrofuran; amides such as N,N-dimethylformamide; sulfoxides such as dimethylsulfoxide; or the like is included.

Use amount of the hydrophilic organic solvent depends on kind of the water-absorbing resin, particle diameter and water content of the particulate water-absorbing resin or the like, but, use amount within a range of 0 part by mass to 20 parts by mass is preferable, and use amount within a range of 0 part by mass to 10 parts by mass is more preferable, relative to 100 parts by mass of solid content of the particulate water-absorbing resin.

In performing surface cross-linking, firstly, a surface cross-linking agent solution is prepared by mixing water and/or a hydrophilic organic solvent, with the surface cross-linking agent in advance. Then, mixing method that this solution is sprayed with a sprayer or the like or dropped to the particulate water-absorbing resin is preferable, and a method for mixing by spraying is more preferable. Size of a droplet sprayed is preferably within a range of 0.1 to 300 μm, and more preferably within a range of 0.1 to 200 μm, as a volume average particle diameter.

The particulate water-absorbing resin is mixed with the surface cross-linking agent, water and/or a hydrophilic organic solvent by use of the mixing apparatus 16. This mixing apparatus 16 preferably has large mixing force to uniformly and surely mix both. As the mixing apparatus 16, for example, a cylinder-type mixing machine, a double wall cone-type mixing machine, a high speed stirring-type mixing machine, a V-type mixing machine, a ribbon-type mixing machine, a screw-type mixing machine, a twin arm-type kneader, a pulverizing-type kneader, a rotation-type mixing machine, an air flow-type mixing machine, Turbulizer, a batch-type Rhedige mixer, a continuous Rhedige mixer or the like is suitable.

In the surface cross-linking step, a mixture of the particulate water-absorbing resin and the surface cross-linking agent enables to perform surface cross-linking even at room temperature, but, in view of promotion of the reaction along with removal of water and the solvent added, it is preferable that, after mixing the particulate water-absorbing resin and the surface cross-linking agent, further heat treatment is performed to cross-link the neighborhood of the surface of the particulate water-absorbing resin. That is, in order to attain a reaction of the cross-linking agent at the neighborhood of the surface of the particulate water-absorbing resin, in consideration of reactivity of the cross-linking agent, simplicity of a production facility and productivity, or the like, it is preferable to perform heat treatment. In this heat treatment, treatment temperature is preferably equal to or higher than 80° C., although it depends on the surface cross-linking agent selected. The treatment temperature of equal to or higher than 80° C. does not take longer time in the heat treatment, and is capable of preventing decrease in productivity, as well as attaining uniform surface cross-linking. In this case, it is capable of preventing decrease in absorption characteristics under pressurization of the particulate water-absorbing agent, as well as remaining of the unreacted surface cross-linking agent. In addition, in view of property, the treatment temperature (temperature of a heating medium or temperature of a material/in particular, temperature of the heating medium) is preferably in a range of 100 to 250° C., more preferably in a range of 150 to 250° C. This temperature range exerts significantly superior effect in a property aspect, in the dehydration esterification reactive surface cross-linking agent.

Heating time is preferably in a range of 1 minute to 2 hours. Suitable examples of a combination of heating temperature and heating time are at 180° C. for 0.1 to 1.5 hour, and at 200° C. for 0.1 to 1 hour. It should be noted that, surface cross-linking at high temperature provides the powder substance with low moisture content, and tends to generate a problem of property decrease caused by damage during transportation, but, such a problem is also solved in the present invention. For example, the present invention is suitably applicable to transportation of the water-absorbing resin powder substance with the moisture content of ERT430.2-02 of 0 to 3% by weight, in particular, 0 to 2% by weight, and in particular, 0 to 1% by weight.

As the heating apparatus 18 for performing the heat treatment, a conventional dryer or a heating furnace is used. For example, a dryer or a heating furnace of a conductive heat transfer-type dryer, a radiation heat transfer-type dryer, a hot air heat transfer-type dryer, an inductive heating-type dryer is suitable. Specifically, a dryer or a heating furnace of a belt-type, a groove-type stirring-type, a screw-type, a rotation-type, a disk-type, a kneading-type, a fluid bed-type, an air flow-type, an infrared ray-type, an electron beam-type is included.

In the surface cross-linking step, the heat treatment may be performed in a static state or under stirring. When the heat treatment is performed under stirring, the surface cross-linking may be completed by heating the mixture in the mixing apparatus 16, where the particulate water-absorbing resin and the surface cross-linking agent were mixed, and the surface cross-linking may be completed by charging the mixture, for example, into a twin-screw groove-type stirring drying apparatus and heating this mixture.

[The Cooling Step]

The cooling step is a step for cooling, as needed, the particulate water-absorbing agent obtained by heating in the surface cross-linking step and cross-linking the neighborhood of the surface, before charging to the subsequent step (for example, the granule sizing step) in order to terminate or control a cross-linking reaction. The cooling apparatus 20 to be used in this cooling step is not especially limited, and, for example, a twin-screw stirring dryer or a groove-type stirring-type dryer or the like, where cooling water is passed through inside of the inner wall or other heat transfer surfaces, can be used, and temperature of this cooling water is set at below heating temperature, that is, equal to or higher than 25° C. and below 80° C., and preferably 30° C. to 60° C.

It should be noted that, in the surface cross-linking step, there may be the case where surface cross-linking of the particulate water-absorbing resin is performed at room temperature. In this case, because the particulate water-absorbing agent obtained by the surface cross-linking is not heated, this cooling step may not be performed. Therefore, this cooling step is other step which may be contained further in this production method, as needed.

[The Addition Step of Additives]

In the present invention, the addition step for adding additives other than the surface cross-linking agent may be installed further. This addition step is preferably installed at and after the polymerization step, and more preferably installed at and after the drying step. The additives may be added at the same time as the surface cross-linking or separately, for example, in the cooling step or other steps. As the additives, for example, the following (A) a deodorant component (preferably, a plant component), (B) a polyvalent metal salt, (C) an inorganic particle (including (D) a composite water-containing oxide), (E) a liquid permeation improver, (F) other additives and the like may be added. By this addition, various functions can be furnished to the particulate water-absorbing agent. Further, the following (G) chelating agent may be added to this particulate water-absorbing agent.

Use amount of the (A) to (E) and (F) differs depending on objectives and functions to be furnished, but, it is usually, as addition amount of one kind thereof, in a range of 0 to 10 parts by mass, preferably 0.001 to 5 parts by mass, and further preferably 0.002 to 3 parts by mass, relative to 100 parts by mass of the water-absorbing resin. Usually, when this addition amount is lower than 0.001 part by mass, sufficient effect and functions to be furnished by the additives cannot be obtained, and when this addition amount is over 10 parts by mass, effect comparable to the addition amount cannot be obtained or water absorbing performance decreases.

(A) The Deodorant Component

The particulate water-absorbing agent can be formulated with the deodorant component, preferably the plant component, in the above amount, in order to exert deodorant property. The plant component is not especially limited, and exemplified in US-A-2004/048955 specification, WO 2002/42379 pamphlet or the like.

(B) The Polyvalent Metal Salt

It is preferable that the particulate water-absorbing agent obtained by the production method of the present invention is formulated with the polyvalent metal salt or a hydroxide of the polyvalent metal, preferably the polyvalent metal salt, more preferably a water-soluble polyvalent metal salt, still more preferably a water-soluble polyvalent metal salt of a trivalent or tetravalent metal, particularly preferably a water-soluble ammonium salt, at the surface of the water-absorbing resin, in order to enhance liquid permeation and powder substance fluidity in moisture absorption. Preferable amount of this polyvalent metal salt is as described above. It has been discovered that formulation of the polyvalent metal salt decrease transportation efficiency and property during transportation in a large degree, and therefore the method of the present invention can be applied suitably. As this polyvalent metal salt, a polyvalent metal salt of an organic acid and a polyvalent metal salt of an inorganic acid described in US-A-2002/0128618 specification, US-A-2006/204755 specification and the like are exemplified. It should be noted that, the water-soluble polyvalent metal salt is a polyvalent metal salt which dissolves in water at normal temperature in equal to or more than 0.1 g/100 g, still more equal to or more than 1 g/100 g, and particularly equal to or more than 10 g/100 g, and it is mixed as the powder substance or a solution, and the solution may be a dispersion solution over saturation concentration.

As a preferable organic polyvalent metal salt, aluminum lactate, calcium lactate or the like is exemplified. In addition, as the preferable inorganic polyvalent metal salt, for example, aluminum chloride, aluminum polychloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, in view of solubility with an absorbing liquid such as urine, use of a salt thereof having crystal water is preferable. A particularly preferable one is an aluminum compound, and among these aluminum compounds, aluminum chloride, aluminum polychloride, aluminum sulfate, aluminum nitrate, potassium aluminum bissulfate, sodium aluminum bisulfate, potassium alum, ammonium alum, sodium alum, sodium aluminate are preferable, and aluminum sulfate is particularly preferable. Powders of water-containing crystal such as aluminum sulfate-octadeca hydrate salt, aluminum sulfate-tetradeca to octadeca hydrate salt may be used most suitably. They may be used as only one kind, or two more kinds may be used in combination. In view of handling property and mixing property with the water-absorbing resin powder substance, the polyvalent metal salt is used preferably in a solution state, and is used particularly preferably in an aqueous solution state. Other than these, the polyvalent metal salt of an organic acid to be used and a mixing method thereof are exemplified, for example, in WO-2004/069936 pamphlet.

Among the polyvalent metal salts, as the water-soluble polyvalent metal salt, aluminum sulfate and various alums are included. The production method of the present invention is effective in the water-absorbing resin powder substance containing the water-soluble polyvalent metal salt. The water-absorbing resin powder substance containing the polyvalent metal salt has the surface difficult to slip, and large friction coefficient at the surface. In particular, in the case of the water-soluble polyvalent metal salt such as aluminum sulfate, increase in this friction coefficient is significant. Due to this high friction coefficient, blocking phenomenon tends to generate. When air pressure is increased in order to suppress this blocking phenomenon, moving velocity (an initial linear velocity $V_x$ and a terminal linear velocity $V_y$) of the water-absorbing resin powder substance in the transportation pipeline increases, and thereby damage of the water-absorbing resin powder substance increases. The present invention is capable of decreasing the initial linear velocity $V_x$ and the terminal linear velocity $V_y$, as well as suppressing the blocking phenomenon, and therefore it is effective in the water-absorbing resin powder substance containing the water-soluble polyvalent metal salt. In addition, the present invention is capable of suppressing the initial linear velocity $V_x$ and the terminal linear velocity $V_y$, and therefore, peeling the polyvalent metal salt from the surface of the powder substance caused by mutual friction can be suppressed. Therefore, property enhancement effect due to the polyvalent metal salt is difficult to be impaired.

(C) The Inorganic Particle

The particulate water-absorbing agent may be formulated with the inorganic particle, in particular, a water-insoluble inorganic particle (water-insoluble fine particles) at the surface of the water-absorbing resin, in order to enhance liquid permeation or prevent blocking in moisture absorption. As the inorganic particle, specifically, for example, a metal oxide such as silicon dioxide or titanium oxide; silicic acid (salt) such as natural zeolite or synthetic zeolite; kaolin, talc, clay, bentonite or the like is included. Among these, silicon dioxide and silicic acid (salt) are more preferable, and silicon dioxide silicic acid (salt), having an average particle diameter of 0.001 to 200 μm, measured by the Coulter counter method, is further preferable.

In addition, in order to exert superior hygroscopic fluidity (fluidity of powder substance after the water-absorbing resin or the water-absorbing agent absorbed moisture) and deodorant function of the particulate water-absorbing agent, a composite water-containing oxide containing zinc and silicon, or a composite water-containing oxide containing zinc and aluminum may be formulated.

When inorganic particles are formulated, a problem of large decrease in transportation efficiency or large decrease in property during transportation has been discovered, but, in the present invention, the initial linear velocity $V_x$ (linear velocity of the water-absorbing resin powder substance at the starting point of the transportation pipeline) can be suppressed, and therefore, peeling of the polyvalent metal salt from the surface of the powder substance caused by mutual friction can be suppressed, and as a result, property enhancement effect by the polyvalent metal salt is difficult to be impaired. Therefore, the method of the present invention is applicable suitably.

(D) The Polyamine Compound (the Polyvalent Amine Compound)

The polyamine may be added in order to enhance liquid permeation and enhance shape retention property of the particulate water-absorbing agent. For example, a water-soluble polyamine compound, in more specifically, polyethyleneimine, polyvinylamine, polyallylamine or the like, having a weight average molecular weight of 200 to 1000000, may be exemplified. In the particulate water-absorbing agent, they are used for surface covering or cross-linking of the water-absorbing resin. A polyamine polymer applicable to the water-absorbing resin is exemplified, for example, in US-A-2003/069359 specification, US-A-2005/0245684 specification, WO 2006/082197 pamphlet, WO 2006/074816 pamphlet, WO 2006/082189 pamphlet, WO 2008/025652 pamphlet, WO 2008/025656 pamphlet, WO 2008/025655A1 pamphlet or the like.

(E) A Liquid Permeation Improver

The liquid permeation improver means the additive for increasing saline flow conductivity (SFC) of the water-absorbing resin or the water-absorbing agent having a saline flow conductivity (SFC) of equal to or higher than 6 ($\times 10^{-7} \cdot cm^3 \cdot s \cdot g^{-1}$) to be described later, by equal to or higher than 10 ($\times 10^{-7} \cdot cm^3 \cdot s \cdot g^{-1}$). Preferably, it is a compound for enhancing liquid permeation by maintaining or expanding a space between particles, as an ion-like spacer (cation) or a stereoscopic spacer (fine particles). Therefore, even the additives exemplified in the (A) to (D) might correspond to this liquid permeation improver. In this production method, it is preferable that this liquid permeation improver is the (B) to (D).

Among these, the water-soluble polyvalent metal salt such as aluminum sulfate, potassium alum, exemplified by the (B) and being capable of becoming an ion-like spacer, is preferable in view of enhancing saline flow conductivity (SFC).

A form of the liquid permeation improver present in the particulate water-absorbing agent may be in a particulate state, or may be a coating state in a molecular level (usually, a coating with a solution), or may be in a combined state thereof. However, the liquid permeation improver is preferably used in an aqueous solution form, in view of easiness of more uniform addition to the whole surface of the water-absorbing resin, and no segregation or the like of the liquid permeation improver. The liquid permeation improver is used preferably in a ratio of 0.001 to 10% by weight, and more preferably in a ratio of 0.01 to 5% by weight, relative to the water-absorbing resin.

[The Surfactant]

It is preferable that the water-absorbing agent contains the surfactant. Presence of the surfactant is capable of enhancing powder substance characteristics (fluidity of the powder substance or fluidity in moisture absorption or the like). In particular, it is preferable that the surfactant is contained at the surface of the water-absorbing resin.

As the surfactant, an anionic surfactant such as a fatty acid salt or a higher alcohol sulfate or the like; a nonionic surfactant such as a sorbitan fatty acid ester (sorbitan monolaurate, sorbitan monopalmitate, sorbitan monostearate, sorbitan tristearate); a cationic surfactant such as an alkyl amine salt (coconut amine acetate, stearyl amine acetate or the like) or an amphoteric surfactant is exemplified. Other than these, a surfactant described in U.S. Pat. No. 6,107,358 is applicable to the present invention. It should be noted that, the addition method for the surfactant is not especially limited, and preferably it is added at the granulation step exemplified in U.S. Pat. Nos. 6,228,930, 6,458,921, 7,153,910 and 7,378,453. In addition, the addition timing of the surfactant is also not especially limited, and any timing may be allowed, for example: (a) the surfactant is added in an aqueous solution of acrylic acid in the polymerization step, and polymerization is performed in the presence of the surfactant; (b) the surfactant is added to the water-containing gel after polymerization in the polymerization step; (c) the surfactant is added during or after drying in the drying step; (d) the surfactant is added during or after pulverization or classification of the dried substance in the pulverization or classification step; (e) the surfactant is added during or after surface cross-linking in the surface cross-linking step; (f) the surfactant is added to the water-absorbing resin as a final product; or the like. It should be noted that the surfactant may be added before and after the surface cross-linking step so as to be contained at the surface.

Use amount of the surfactant is preferably 0.0005 to 0.012 part by weight, more preferably 0.0005 to 0.001 part by weight, still more preferably 0.001 to 0.0045 part by weight, and particularly preferably 0.0015 to 0.004 part by weight relative to 100 parts by weight of the water-absorbing resin. The amount below 0.0005 parts by weight might provide insufficient enhancement of fluidity and bulk density. On the other hand, the amount over 0.012 parts by weight has a problem of decrease in surface tension of an absorption fluid, as well as could not provide effect comparable to the addition amount, and is thus uneconomical.

The surfactant to be used in the present invention is not limited to the above surfactants. Among the above surfactants, in view of safety, nonionic surfactants are preferable, and among them, a sorbitan fatty acid ester and a polyoxyethylene sorbitan fatty acid ester are particularly preferable. In addition, HLB (hydrophilic property-hydrophobic property balance) of the surfactant to be used in the present invention is not especially limited, but, it is in a range of preferably 8 to 18, more preferably 9 to 17, and still more preferably 10 to 17. When HLB is within this range, fluidity and bulk density of the particulate water-absorbing agent can be enhanced more suitably.

(G) A Chelating Agent

The water-absorbing resin powder substance to be used in the present invention may contain the chelating agent for coloring prevention, urine resistance enhancement or the like. A step for mixing the chelating agent is not especially limited, but, it is preferable that the chelating agent is mixed into the monomer or the monomer solution. The chelating agent is not especially limited, and for example, a chelating agent exemplified in EP-A-1426157, WO-2007/28751 and WO-2008/90961 can be used. From an effect aspect, preferable one is a water-soluble organic chelating agent whose molecular weight is 100 to 1000. As a specifically preferable chelating agent, for example, an amino carboxylic acid-based metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexacetic acid, and a salt thereof; and an amino polyvalent phosphorous compound such as ethylenediamine-N,N'-di (methylenephosphinic acid), ethylenediamine tetra (methylenephosphinic acid), polymethylenediamine tetra (methylenephosphonic acid), diethylenetriamine penta (methylenephosphonic acid), and 1-hydroxyethylidene diphosphonic acid, and a salt thereof; is included. It is desirable that use amount of the chelating agent is equal to or more than 0.001 part by mass, preferably equal to or more than 0.05 part by mass, and still more preferably equal to or more than 0.1 part by mass, relative to 100 parts by mass of the water-absorbing resin contained in the water-absorbing resin powder substance, as well as equal to or less than 1 part by mass, preferably equal to or less than 0.5 part by mass, and still more preferably equal to or less than 0.2 part by mass, relative to 100 parts by mass of the water-absorbing resin.

The (B) and (C) can be used suitably as a surface treatment agent. Surface treatment in the present application means that a region of the surface or the neighborhood of the surface of the water-absorbing resin has been surface cross-linked by chemical or physical modification. In this case, chemical modification means a state of modification accompanying with any chemical bonding (covalent bond or ionic bonding), and physical modification means physical covering or attachment without accompanying with the chemical bonding.

(H) A Lubricant (a Slip Property Improver)

It is preferable that the particulate water-absorbing agent contains the lubricant. In particular, it is preferable that the lubricant is contained at the surface of the water-absorbing resin. "The lubricant" means a substance present between two surfaces mutually slipping, and has an action to decrease friction (resistance). The lubricant which can be used in the present invention is not especially limited, as long as it is a solid lubricant at normal temperature (25° C.) and under normal pressure (0.101 MPa). The lubricant is exemplified in U.S. Pat. No. 7,473,739 specification, WO 2008/120742 pamphlet or the like, and the lubricant exemplified therein may be used preferably also in the present invention. For example, a hydrocarbon-based lubricant, a fatty acid-based lubricant (preferably having equal to or more than C12), a fatty acid amide-based lubricant, an ester-based lubricant, an alcohol-based lubricant (glycol or a high alcohol), a metal soap lubricant or the like is included. Among them, in view of having an action as a lubricant as well as also having an action as a stabilizer, it is preferable to use a metal soap lubricant exemplified in U.S. Pat. No. 7,282,262 specification.

Powder substance temperature of the water-absorbing resin in mixing with the lubricant is usually set at equal to or higher than room temperature, but, it is mixed preferably at equal to or higher than 40° C., and more preferably at equal to or higher than 50° C., to obtain stable water absorbing characteristics or flow down speed or bulk density of the particulate water-absorbing agent. The amount is preferably 0.0001 to 0.1% by weight, more preferably 0.01 to 0.05% by weight, and particularly preferably 0.001 to 0.01% by weight, relative to 100% by weight of the water-absorbing resin.

In particular, in the present invention, as the additive to enhance liquid permeation, (B) the polyvalent metal salt is preferable. It is preferable that the polyvalent metal salt is mixed after the addition. As an apparatus for mixing, the mixing apparatus 16, which is same as for the surface cross-linking agent may be included.

It should be noted that, the polyvalent metal salt is preferably mixed with the water-absorbing resin particles (the particulate water-absorbing resin) as an aqueous solution. Size of a droplet of the aqueous solution can be adjusted as appropriate. In view of preventing permeation and diffusion of a polyvalent metal ion (for example, an aluminum ion) into the inside of the water-absorbing resin particles, the aqueous solution preferably has a concentration of equal to or higher than 50%, more preferably equal to or higher than 60%, further preferably equal to or higher than 70%, further preferably equal to or higher than 80%, and particularly preferably equal to or higher than 90%, relative to saturated concentration. Naturally, it may have the saturated concentration (=100% to the saturated concentration). In addition, from the similar reason, use amount of water is about 0.1 to 30% by weight, and still more about 0.2 to 10% by weight relative to weight of the water-absorbing resin, and drying may be performed after the addition as needed.

[The Granule Sizing Step]

Irrespective of adjustment of the particle diameter in the pulverization step and classification step, there may be the case where an aggregated substance having large particle diameter is included in the particulate water-absorbing agent after the surface cross-linking step or the cooling step. This aggregated substance may be generated principally in mixing the surface cross-linking agent, or in a surface cross-linking reaction. In this granule sizing step, the crushing treatment and classification treatment of this aggregated substance are performed. Performing order and number of times of this crushing treatment and classification treatment are not especially limited. In this granule sizing step, in order to adjust particle size again or the like, for example, firstly the classification treatment is performed for the particulate water-absorbing agent. In this classification treatment, a classification apparatus such as a sieve or an air flow classification machine is used to remove the aggregated substance with large particle diameter or the fine powders with small particle diameter. For the aggregated substance obtained by this classification treatment, the crushing treatment is performed to crush and separate particles composing the aggregated substance to an individual particle. In this crushing treatment, for example, a knife cutter-type crushing machine is used. For the crushed substance obtained by this crushing treatment, the classification treatment is performed again to remove the fine powders having small particle diameter, as well as to obtain the particulate water-absorbing agent having desired particle diameter (preferably, a weight average particle diameter of 200 to 800 μm). In view of productivity, it is preferable that this granule sizing step is performed after the cooling step. It should be noted that in this production method, when the aggregated substance with large particle diameter is not contained in the particulate water-absorbing agent before charging to this granule sizing step, this granule sizing step may not be performed. This granule sizing step is other step which may be contained further in the production method of the present invention, as needed.

[The Packaging Step]

The packaging step is a step where the particulate water-absorbing agent is packaged. When the granule sizing step is performed, in this packaging step, the particulate water-absorbing agent, which was granule-sized in the above-described granule sizing step, is packaged. For example, in this packaging step, the particulate water-absorbing agent transferred to a hopper for storage is packed into a storing bag by use of the filling apparatus 24. The particulate water-absorbing agent packed in the storing bag is shipped as a product via the predetermined inspection.

[A Fine-Powder Recycling Step]

The fine-powder recycling step is a step for returning the fine powders removed by classification or the like (for example, particles containing particles below 150 μm as a principal component, in particular, in an amount of equal to or more than 70% by weight) to the production step of the water-absorbing resin, preferably by recycling to the polymerization step or the drying step, and removal and reuse of the fine powders are possible. That is, in one embodiment of the present invention, the water-absorbing resin powder substance contains a fine powder recycled substance of the water-absorbing resin. In such a recycling step, the fine powders may be returned as themselves, or may be recycled after granulation in a granulation step to be described later. A recycling method includes: the fine powders are mixed into a polymerization machine, preferably a stirring polymerization machine such as a kneader to make a unified substance; the fine powders or a granulated substance thereof are mixed with polymer gel separately after polymerization; for example, (crushing) mixing with a meat chopper; or mixing in a dryer.

Conventionally, as estimated to be derived from fracture or regeneration of the fine powders, the water-absorbing resin passing via such a fine powder recycling step, that is, the water-absorbing resin containing the fine powder recycled product tended to decrease property easily in the transportation step, but, in the present invention, there are no such problems as well, because impact which the fine powders receive can be suppressed. A preferable fine powder recycling method is exemplified, for example, in U.S. Pat. Nos. 6,133, 193, 6,228,930, 5,455,284, 5,342,899, US-A-2008/0306209, and amount of the fine powders is decreased by adding the fine powders in the production step of the water-absorbing resin such as the polymerization step, the gel pulverization step, the drying step, or the like. In addition, recycling amount of the fine powders is determined as appropriate, for example, in about 1 to 30% by weight, still more 5 to 25% by weight, particularly 8 to 20% by weight of production capacity. In addition, the fine powders are recycled to the production step, as dry powders themselves, or as a gell turned by adding water as needed, or in particular, recycled to a monomer and/or gel (before drying or during polymerization).

[The Granulation Step]

The granulation step is a step for obtaining the granulated particle by adding aqueous liquid to the fine powders. The fine powders may be obtained by the classification step. The fine powders may be those collected with a fine powder capturing apparatus 26 from atmosphere of other step (the pulverization step or the granule sizing step or the like). The fine powder capturing apparatus, for example, is provided with a filter which is capable of capturing the fine powders. The granulated particle is composed of a plurality of the fine powders. Weight average particle diameter of the granulated particle is equal to or smaller than 20 mm, preferably 0.3 to 10 mm, and more preferably 0.35 to 5 mm. It should be noted that the granulation may be performed using only the fine powders (for example, a substance passed 150 μm), or may be performed using the whole particles (the water absorbing resin powder substance which is a substance passed 850 μm, and contains a substance passing 150 μm in predetermined amount) containing the fine powders.

The granulated particle obtained by the granulation step may be used as it is as a granulated product, but, it is preferably charged to any of the steps. In view of production efficiency, it is preferable that this granulated particle is charged to the drying step as a fine particle recycling step and dried in the co-presence of the polymer gel. As shown in FIG. 1, in this production facility 2, the transportation part 6 jointed to the fine powder capturing apparatus 26 is jointed to the granulation apparatus 28. This granulation apparatus 28 is jointed to the drying apparatus 10 by the transportation part 6. The fine powders discharged from the fine powder capturing apparatus 26 are charged to the granulation apparatus 28 by being transported through the transportation part 6. The fine powders are also the water-absorbing resin powder substance. The granulated particle formed at this granulation apparatus 28 is also put to the drying apparatus 10 by being transported through the transportation part 6. It can be confirmed that the particulate water-absorbing agent is the granulated particle from the fact that an individual particle is aggregated by gathering in multiple while maintaining shape thereof, or from the fact that it swells as a plurality of discontinuous particles in absorbing a solution, with an optical microscope.

[A Storage Step]

Figure 2:
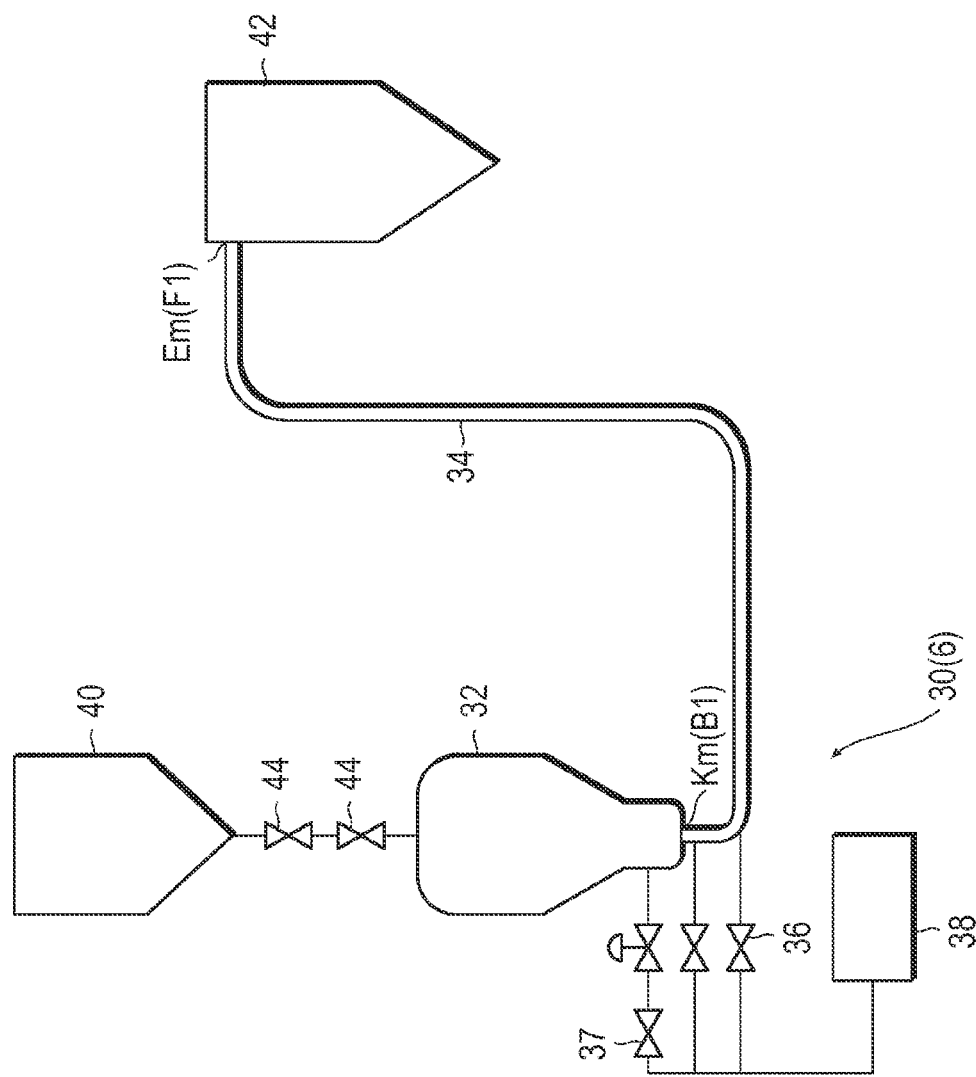
FIG. 2 is a drawing showing a schematic configuration of a transportation apparatus capable of being used in one embodiment of the present invention.

It is preferable that the production method for the particulate water-absorbing agent (the water-absorbing resin) of the present invention includes the storage step of the water-absorbing resin powder substance. An apparatus to be used in this storage step is called "a hopper" in the present invention. The hopper is an apparatus for storing and managing the water-absorbing resin powder substance temporarily or for a long period, and in the present invention, a silo-like (longitudinally longer shape) one is also included, as long as it is specified shape. Specifically, as shown in FIG. 2 to be described later, an apparatus such as 40 (a receiving hopper), 32 (a pressurized tank hopper), 43 (a storage hopper) or the like is included.

By using the hopper, it becomes possible to feed to an apparatus to be used in each step, in quantitative mass flow, without damaging or fracturing the water-absorbing resin powder substance. In this way, the water-absorbing resin with high function and high property can be produced stably without variation by lot.

Figure 3:
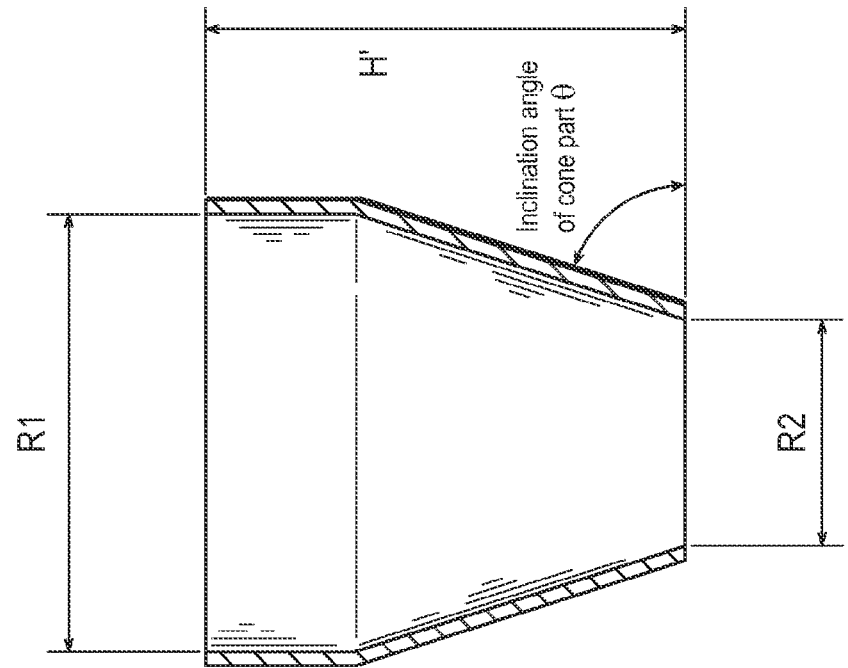
FIG. 3 is a schematic view showing maximum caliber part (R1) of the upper part of a hopper, and caliber (R2) and height (H) of the discharging part of the hopper, specifying ratio of inclination angle and drawing rate of a cone part, and ratio of maximum caliber (diameter) and height of the hopper, relating to the hopper capable of being used in one embodiment of the present invention.
Figure 3:
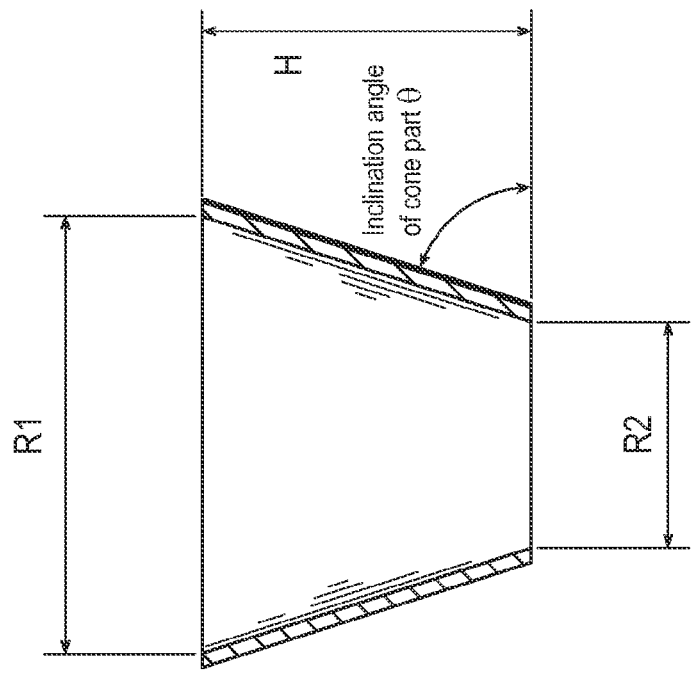

FIG. 3 is a schematic view of the hopper which can be used in one embodiment of the present invention. As shape of the hopper, in view of carrying property and transferring property of the powder substance, in particular, the water-absorbing resin powder substance, an inverse truncated pyramid shape or an inverse circular truncated cone shape, as shown in the left drawing of FIG. 3, along with shape where at the maximum caliber part of the inverse truncated pyramid a rectangular column of the same shape is added, or shape where at the maximum caliber part of the inverse circular truncated cone a circular cylinder of the same shape is added, as shown in the right drawing of FIG. 3, are preferably used. In addition, ratio of maximum caliber (diameter) and height of the hopper (maximum caliber of the hopper/height of the hopper, for example, "R1/H" in FIG. 3) is in a range of 1/10 to 10/1, still more 1/3 to 3/1, and particularly 1/2 to 2/1. In this case, for the inverse truncated pyramid shape or the inverse circular truncated cone shape, as shown in the left drawing of FIG. 3, "height of the hopper" indicates height of the inverse truncated pyramid part or the inverse circular truncated cone part ("H" in the left drawing of FIG. 3). In addition, for the inverse truncated pyramid shape or the inverse circular truncated cone shape added with the rectangular column or the circular cylinder, as shown in the right drawing of FIG. 3, it indicates total height of height of the inverse truncated pyramid part or the inverse circular truncated cone part, added with height of the rectangular column part or the circular cylinder part ("H'" in the right drawing of FIG. 3). In addition, when the hopper is not a cylinder, maximum caliber of the hopper is specified in terms of a diameter of a circle equivalent to the maximum cross-section thereof. As for shape of the inverse truncated pyramid shape or the inverse circular truncated cone shape, as ratio of the inverse pyramid (or the inverse circular cone) and the truncated part, it is adopted one where height of the truncated part is smaller, or in the case where the hopper cross-section has home base shape, cross-section of the triangle part thereof is adopted principally. That is, a principal component of the water-absorbing resin powder substance, preferably equal to or more than 50% by weight, and still more preferably equal to or more than 80% by weight is stored in a part of pyramid or circular cone of the hopper.

In the present invention, it is preferable to use the hopper having specified shape of a cone inclination angle of equal to or larger than 45 degree, and a drawing rate of 0.3 to 0.8. The upper limit of the cone inclination angle is preferably below 90 degree. In the present description, the "cone inclination angle" is, as shown in FIG. 3, inclination angle of a side wall surface relative to a horizontal surface of the hopper installed.

The cone inclination angle of the hopper of the present invention is set at preferably equal to or larger than 50 degree, still more preferably 60 to 90 degree, particularly preferably 65 to 85 degree, and most preferably 68 to 85 degree. It should be noted that, when the side wall surface is not flat, it is specified by average value of angles determined from the whole side wall surfaces thereof.

In addition, in the present description, the "drawing rate" is a value of ratio (R2/R1×100) specified by caliber of the opening part of the upper surface of the hopper (maximum caliber part of the upper part of the hopper (R1)) and the opening part of the bottom surface of the hopper (caliber of the discharging part of the hopper (R2)), expressed in percent. The drawing ratio of the hopper is set at preferably 30 to 80%, more preferably 35 to 80%, still more preferably 40 to 80% and particularly preferably 40 to 70%. It should be noted that, when the caliber is not a circle, for example, an ellipse or a polygon, it is specified in terms of a circle equivalent to the cross-section thereof. When the hopper within the above range is used, the desired water-absorbing resin with high property can be produced stably.

In addition, a filling rate (average) of the water-absorbing resin powder substance inside the hopper is over 0% by volume and equal to or lower than 90% by volume, preferably 10 to 80% by volume, still more preferably 30 to 80% by volume, and particularly preferably 40 to 80% by volume. In the present description, "the filling rate" is specified by volume ratio (% by volume) of the water-absorbing resin to be packed relative to inner volume of the hopper, and by controlling it within the above range, transfer property of the water-absorbing resin becomes good.

A material of the hopper is not especially limited, but, stainless steel is preferable, and surface roughness or the like of the inner surface thereof is in accordance with the pipeline which can be used in a pneumatic transportation step to be described later has.

It is preferable that a residence time (average) of the water-absorbing resin in the hopper is also controlled, and the residence time is preferably equal to or shorter than 24 hours, more preferably equal to or shorter than 12 hours, still more preferably equal to or shorter than 6 hours and particularly preferably equal to or shorter than 2 hours, although it depends on amount of the water-absorbing resin filling in the hopper. The case where the residence time is over 24 hours may generate property decrease or blocking, and is thus not preferable. It should be noted that, the lower limit of the residence time (average) of the water-absorbing resin in the hopper is not especially limited, and it is preferable to be as short as possible.

It should be noted that, as an embodiment exerting most effect of the present invention, the method of the present invention is applied to a production method in producing the water-absorbing resin in a production capacity of, for example, equal to or higher than 100 kg per hour, preferably equal to or higher than 500 kg per hour, and particularly preferably equal to or higher than 1 ton (Metric ton) per hour.

Further, it is preferable that the hopper is heated, and temperature of the surface thereof is preferably in a range of 40 to 120° C., still more preferably 50 to 90° C., and particularly preferably 60 to 80° C. In addition, it is preferable that the water-absorbing resin powder substance stored in the hopper is also heated, and temperature thereof is preferably in a range of 40 to 120° C., still more preferably 50 to 90° C., and particularly preferably 60 to 80° C. The case of lower temperature than the above temperature might generate property decrease or increase in variation width of property value, and aggregation of the water-absorbing resin. In addition, the case of higher temperature than the above may generate a case of property decrease or increase in variation width of property value, as well as coloring of the water-absorbing resin.

In addition, a moisture content of the water-absorbing resin powder substance to be stored in this hopper is not especially limited, but, preferably 0.1 to 30% by weight, and more preferably 0.1 to 10% by weight. By setting the moisture content at the above range, in storing (or packing) the water-absorbing resin powder substance in this hopper, damage can be reduced and property decrease can be suppressed.

When the powder substance (the water-absorbing resin powder substance) is handled in each step, the hopper is applied at each step, in discharging the powder substance after storage of the powder substance in at least one or more positions including and subsequent to the drying step. That is, the hopper may be installed at any time during the drying step; during the pulverization or classification step; during the surface cross-linking step; between the drying step and the pulverization or classification step; between the pulverization or classification step and the surface cross-linking step; during or after the step for filling (the filling step) a container bag or the like with the water-absorbing resin, obtained as the final product at and after the surface cross-linking step; between the surface cross-linking step and the filling step; or the like. In addition, the hopper may be installed at one place, or at two or more places at each of the time. Further, in the latter case, a plurality of the hoppers may be installed continuously, or other step (or an apparatus) may be installed between the hoppers.

Carrying of the water-absorbing resin powder substance from the previous step to the storing step, or carrying from the storing step to the next step, with this hopper is preferable performed by pneumatic transportation to be described later. The production method relevant to one preferable embodiment of the present invention has a step for storing the water-absorbing resin powder substance after the pneumatic transportation step. According to such an aspect, there is no property decrease caused by impact, as well as quality of high property can be maintained stably, and is thus preferable.

[Property of the Water-Absorbing Resin]
(Particle Shape)

Particle shape of the water-absorbing resin powder substance is not especially limited. As this particle shape, powders of spherical-shape, nearly spherical-shape, irregular pulverized shaped (which is a pulverized substance), bar shape, polygonal shape, sausage shape (for example; refer to U.S. Pat. No. 4,973,632 specification), a particle with wrinkles (for example; refer to U.S. Pat. No. 5,744,564 specification) and the like are included. They may be a single particle, or granulated particle, or a mixture of the single particle and the granulated particle. In addition, the particle may be a foamed porous one. Preferably, a single particle with irregular pulverized shape or a granulated substance thereof is included.

(Particle Size)

Mass average particle diameter (D50) of the water-absorbing resin before surface cross-linking and/or in the final product is preferably 200 to 600 μm, more preferably 200 to 550 μm, still more preferably 250 to 500 μm, and particularly preferably 350 to 450 μm. In addition, the particle below 150 μm is preferably as less as possible, and usually adjusted at 0 to 5% by mass, preferably 0 to 3% by mass, and particularly preferably 0 to 1% by mass. Still more, the particle equal to or larger than 850 μm is preferably as less as possible, and usually adjusted at 0 to 5% by mass, preferably 0 to 3% by mass, and particularly preferably 0 to 1% by mass. Logarithm standard deviation (σζ) of particle size distribution is preferably set at 0.20 to 0.40, more preferably 0.27 to 0.37, and still more preferably 0.25 to 0.35. As for these measuring methods, as a method using a standard sieve, for example, it is described in WO 2004/069915 pamphlet or EDANA-ERT420.2-02.

(Absorbency, CRC (Free Swelling Ratio (GV)))

It is preferable that absorbency against non-pressure (CRC) for a normal saline solution of the water-absorbing resin powder substance after surface cross-linking, and still more after transportation is equal to or higher than 15 g/g. Absorbency against non-pressure (CRC) of the water-absorbing resin powder substance before surface cross-linking is not especially limited, but, it is preferably equal to or higher than 15 g/g. The absorbent articles such as disposable diapers, where this water-absorbing resin powder substance is used, absorb body fluid or the like well. From this viewpoint, absorbency (CRC) after surface cross-linking or before surface cross-linking is preferably equal to or higher than 20 g/g, still more preferably equal to or higher than 25 g/g, and particularly preferably equal to or higher than 30 g/g. In view of performance of the absorbent articles, the higher absorbency (CRC) is the better. However, in the view point that the water-absorbing resin powder substance can be produced stably and obtained at low cost, this absorbency (CRC) is preferably equal to or lower than 60 g/g, still more preferably equal to or lower than 50 g/g, and particularly preferably equal to or lower than 35 g/g. It should be noted that in the present invention, absorbency against non-pressure (CRC) is synonymous as free swelling ratio (GV), and CRC may be referred to as GV in some cases.

In measurement of absorbency against non-pressure (CRC), about 0.2 g of the water-absorbing resin powder substance is prepared. Mass W1 of this water-absorbing resin powder substance is measured. This water-absorbing resin powder substance is put uniformly in a bag made of non-woven fabric (60 mm×85 mm). This bag is immersed in a normal saline solution with a temperature adjusted at 25±2° C., for 30 minutes. Next, this bag is pulled up, and put into a centrifugal separation apparatus (a compact-type centrifugal separation apparatus, model-type: H-122, manufactured by Kokusan Co., Ltd.). This centrifugal separation apparatus is operated under condition of 250 G (250×9.81 m/s$^2$) for 3 minutes. Mass W2 (g) of the bag thereafter is measured. On the other hand, similar processing is performed on the bag not containing the water-absorbing resin powder substance, and mass W3 (g) thereof is measured. Absorbency against non-pressure (CRC) is calculated according to the following Expression.

$$CRC(g/g)=[(W2-W3)/W1]-1 \quad \text{[Expression 1]}$$

(Absorbency Against Pressure, AAP)

Absorbency against pressure (AAP) for a normal saline solution under pressure (ERT422.2-02, under condition of a load of 50 g/cm$^2$) of the water-absorbing resin powder substance after surface cross-linking, and still more after transportation is preferably 15 to 50 g/g, more preferably 18 to 45 g/g, particularly preferably 20 to 45 g/g, and most preferably 20 to 45 g/g. The absorbent articles such as disposable diapers, where this water-absorbing resin powder substance is used, absorb body fluid or the like well. It should be noted that absorbency against pressure (AAP) is absorbency (unit: g/g) after swelling under a load of 21 g/cm$^2$, for 1 hour for a 0.9% aqueous solution of sodium chloride. It should be noted that, hereafter in Examples of the present application, "AAP" is defined as a value measured similarly except that the load is changed to 50 g/cm$^2$.

(Liquid Permeation, SFC, Between Particles)

Saline flow conductivity (hereafter referred to SFC as well), for 0.69% by mass normal saline aqueous solution, of the water-absorbing resin powder substance is a value showing liquid permeation in swelling of the water-absorbing resin powder substance or the water-absorbing agent. The larger is this SFC value, the water-absorbing resin powder substance shows to have the higher liquid permeation. SFC of the water-absorbing resin powder substance (a surface cross-linked polyacrylic acid (salt)-based water-absorbing resin powder substance) is preferably equal to or larger than 10 ($\times 10^{-7} \cdot \text{cm}^3 \cdot \text{s} \cdot \text{g}^{-1}$), more preferably 20 to 1000 ($\times 10^{-7} \cdot \text{cm}^3 \cdot \text{s} \cdot \text{g}^{-1}$), and still more preferably 30 to 500 ($\times 10^{-7} \cdot \text{cm}^3 \cdot \text{s} \cdot \text{g}^{-1}$). In the present invention, because the initial linear velocity Vx can be suppressed, decrease in SFC during transportation can be suppressed. Such an evaluation is performed in accordance with the SFC test described in U.S. Pat. No. 5,849,405.

It should be noted that, in general, AAP, CRC and SFC tend to be contradictory, but, by adopting the above range, the water-absorbing resin having these properties balanced can be provided.

(Moisture Content)

Moisture content (specified by reduced amount on drying in heating 1 g at 180° C. for 3 hours) of the water-absorbing resin (the particulate water-absorbing agent) obtained finally is preferably equal to or lower than 5% by weight, more preferably equal to or lower than 3% by weight. Certain amount of water, preferably equal to or more than 0.1% by weight, more preferably equal to or more than 0.5% by weight, is capable of maintaining and enhancing absorbing speed or property after transportation. Adjustment of the moisture content may be performed as appropriate by adjusting heating condition or the addition amount of water as needed.

[Features of the Present Invention]

Usually, as for the water-absorbing resin surface cross-linked by covalent bond or surface polymerization with the surface cross-linking agent, liquid permeation is enhanced in spacer-likely (steric) or ionic way by the liquid permeation improver, separately. That is, as preferable aspects, (1) the surface cross-linking agent with covalent property, (2) the liquid permeation improver functioning as a spacer-like (steric) or an ionic cross-linking agent, (3) a lubricant (a slip property improver) is used, and still more (4) pneumatic transportation is applied.

As described above, the production method for the particulate water-absorbing agent (water-absorbing resin) of the present invention includes the pneumatic transportation step for the particulate water-absorbing agent. As for pneumatic transportation, a method for pneumatic transportation described, for example, in JP-A-2004-345804, WO 2007/104657 pamphlet, WO 2007/104673 pamphlet and WO 2007/104676 pamphlet may be used. In the pneumatic transportation step, the particulate water-absorbing agent is transported in a transportation pipeline by use of a transportation apparatus under low concentration, or a transportation apparatus under high concentration. In addition, into the inside of the transportation pipeline, secondary air is jetted as needed.

Size of the transportation apparatus under high concentration is not especially limited, and is determined corresponding to amount of the particulate water-absorbing agent to be transported or a transportation distance. The transportation distance of the particulate water-absorbing agent is controlled by adjusting length of the transportation pipeline. The production method of the particulate water-absorbing agent (water-absorbing resin) relevant to a preferable embodiment of the present invention is a method for adding the lubricant (the slip property improver) to the water-absorbing resin having a cross-linked structure, after adding the surface cross-linking agent and the liquid permeation improver. Therefore, the particulate water-absorbing agent obtained by the production method of the present embodiment, because of presence of a layer of the slip property improver at the most outside, that is, an opposite side of the water-absorbing resin present at the center part, enhances fluidity in moisture absorption and fluidity in a dry state. As a result, the particulate water-absorbing agent has good handling property in transportation, and has less attachment to an apparatus or the like. In addition to this, the particulate water-absorbing agent is superior in liquid permeation due to having the layer of the liquid permeation improver. As a result, the particulate water-absorbing agent has small decrease rate of saline flow conductivity (SFC) caused by pneumatic transportation, and is superior in damage resistance. Further, in the production method for the particulate water-absorbing agent (water-absorbing resin) of the present invention, effect of the present invention becomes far more obvious in the pneumatic transportation step, by jetting secondary air into the inside of the transportation pipeline.

It should be noted that, as described above, in the particulate water-absorbing agent containing the liquid permeation improver such as the polyvalent metal salt or the water-insoluble fine particle, and the production method therefor, it was discovered a particular problem in a practical production, that is, a problem of decrease in transportation property (decrease in productivity) accompanying with use of the liquid permeation improver, and decrease in property accompanying with transportation after mixing the liquid permeation improver. In particular, in such property decrease, a scale factor (property decrease from a laboratory) is significant. In the present invention, by passing the following pneumatic transportation step, decrease in productivity and decrease in property can be suppressed even in large scale production. It should be noted that, property of the particulate water-absorbing agent indicates property of a final product in the production step, and property of the water-absorbing resin indicates property at an intermediate step in the production step (in particular, property after surface cross-linking or after adding the liquid permeation improver, in particular, property before carrying, after adding the liquid permeation improver).

[The Pneumatic Transportation Step]

Outline of the production step of the particulate water-absorbing agent relevant to the present invention is as described above. Explanation will be given next on the transportation method relevant to the present invention. The present invention, in the production method of the water-absorbing resin including the polymerization step of the aqueous solution of an unsaturated monomer; the drying step of the hydrogel polymer obtained in the polymerization step; and the surface cross-linking step for surface cross-linking the particulate water-absorbing resin obtained in the drying step, includes the step (the pneumatic transportation step) for pneumatic transporting the water-absorbing resin powder substance generated in each step in a pipeline with a surface roughness (Rz) of the inner surface of equal to or smaller than 800 nm, by using gas with a dew point of −5° C. to −100° C. By this method, property of the water-absorbing resin can be enhanced.

FIG. 2 is a schematic view of a pneumatic transportation apparatus 30 which can be used in one embodiment of the present invention. The pneumatic transportation apparatus 30 has a pressurized tank hopper 32, a transportation pipeline 34, a pipeline for the secondary air (not shown), a valve 37, a valve for the secondary air 36, and a compressor 38. The compressor 38 is connected to the pressurized tank hopper 32 via the valve 37. By the compressor 38, inside the pressurized tank hopper 32 can be pressurized. In addition, the compressor 38 is connected to the transportation pipeline 34 via the valve 37. The compressor 38 can supply air of the transportation pipeline 34. The secondary air is supplied via the valve 36. The secondary air is supplied to the pipeline for the secondary air via the valve 36. The compressor 38 can supply air (the secondary air) of the pipeline for the secondary air. In FIG. 2, one compressor 38 is drawn, but, the compressor 38 may be present in multiple. It should be noted that, a method for supplying the secondary air is present variously and is not limited to the method of the present embodiment.

In the embodiment of FIG. 2, the pneumatic transportation apparatus 30 transports the water-absorbing resin powder substance from a receiving hopper 40 to the storage hopper 42. For example, assumed is the case where the pneumatic transportation apparatus 30 connects an apparatus for performing a step X, and an apparatus for performing a step Y. The step X and the step Y are not especially limited. The step Y is the next step of the step X. In this case, in the receiving hopper 40, the water-absorbing resin powder substance generated by the step X is stored. In addition, the water-absorbing resin powder substance transported by the pneumatic transportation apparatus 30 is stored in the storage hopper 42 and supplied to the step Y. That is, in the present embodiment, the hoppers (40, 32) are installed after the step X, and after the water-absorbing resin powder substance is stored in this hopper (the storage step), this water-absorbing resin powder substance is pneumatically transported via the transportation pipeline 34 (the pneumatic transportation step), and the water-absorbing resin powder substance transported is stored in the hopper (42) before the step Y (the storage step). It should be noted that, the storage hopper 42 corresponds to a storage part in the embodiment of FIG. 5 to be described later. The water-absorbing resin powder substance stored in the receiving hopper 40 falls into the pressurized tank hopper 32 by opening a valve 44. Next, the valve 44 is closed to introduce pressurized air into the pressurized tank hopper 32. By pressure of this air (primary air), the water-absorbing resin powder substance in the pressurized tank hopper 32 moves inside the transportation pipeline 34, and reaches the storage hopper 42. Pneumatic transportation is possible even by primary air only, but, in the present embodiment, by using the secondary air still more, more preferable transportation can be performed.

Pneumatic transportation relevant to the present invention is applied to transportation of the water-absorbing resin powder substance (the particulate water-absorbing resin and the particulate water-absorbing agent) generated in each of the steps, in particular, after surface cross-linking. That is, pneumatic transportation is applicable to the transportation parts 6 shown in FIG. 1. Pneumatic transportation is not suitable between the polymerization apparatus 8 and the drying apparatus 10, between the mixing apparatus 16 and the heating apparatus 18, and between the granulation apparatus 28 and the drying apparatus 10, because a substance to be transported is moist, but, in other transportation parts 6, pneumatic transportation can be used suitably because the substance to be transported (the water-absorbing resin powder substance) is in a dry state. Preferably, the pneumatic transportation step is included after the surface cross-linking. Pneumatic transportation of the present invention may be used in at least one place, or at two or more places among the transportation parts 6 of FIG. 1. For the transportation part 6, where pneumatic transportation is not adopted, a mechanical transportation, for example, a conveyor or the like can be adopted.

(A Material)

As a material of the transportation pipeline, it is preferably to use stainless steel. The inner surface of the transportation pipeline is preferably mirror finished. By this mirror finishing, damage which the water-absorbing resin powder substance receives can be suppressed. By mirror finishing of stainless steel, damage suppression effect is still more enhanced. As the stainless steel, SUS304, SUS316, SUS316L or the like is included.

In the present invention, the inner surface of the pipeline is controlled to have a surface roughness (Rz), specified by JIS B 0601-2001, of equal to or smaller than 800 nm. The surface roughness (Rz) is smoothened to preferably equal to or smaller than 500 nm, more preferably equal to or smaller than 300 nm, still more preferably equal to or smaller than 200 nm, particularly preferably equal to or smaller than 185 nm, and most preferably equal to or smaller than 170 nm. It should be noted that, the surface roughness (Rz) means the maximum value of maximum height (μm) of surface irregularity. The lower limit of the surface roughness (Rz) is 0 nm, but, because there is no big difference even by about 10 nm, it is enough by about 10 nm, and still more 20 nm. Other surface roughness (Ra) can be also specified by JIS B 0601-2001, and preferable value thereof is also set at the same value as Rz. More preferably, Ra is equal to or smaller than 250 nm, and particularly preferably equal to or smaller than 200 nm. Such a surface roughness may be measured with a probe-type surface roughness meter, in accordance with JIS B 0651-2001.

(Dew Point)

In this transportation method, in the view point that superior property of the water-absorbing resin powder substance can be maintained stably and blocking phenomenon can be suppressed, as primary air and secondary air, it is preferable that dried air is used. Dew point of this air is preferably equal to or lower than −5° C., more preferably equal to or lower than −10° C., still more preferably equal to or lower than −12° C., and particularly preferably equal to or lower than −15° C. In view of cost performance, a range of dew point is equal to or higher than −100° C., preferably equal to or higher than −70° C., and still more preferably about −50° C. is enough. Still more, it is preferable that temperature of gas is about 10 to 40° C., and still more 15 to 35° C.

Other than dried gas (air), heated gas (air) may be used. In this case, a heating method is not especially limited, but, gas (air) may be heated directly by using a heating medium, or gas (air) to be passed may be heated indirectly by heating the transportation pipeline or the apparatus. The lower limit of temperature of this heated gas (air) is preferably equal to or higher than 20° C., and more preferably equal to or higher than 30° C. In addition, the upper limit of the temperature of the heated gas (air) is preferably below 70° C., and more preferably below 50° C.

As a control method for the dew point, gas, preferably air may be dried as appropriate. Specifically, a method for using a membrane dryer, a method for using a cooling adsorption-type dryer, a method for using a diaphragm dryer, and a method for using these in combination are included. When the adsorption-type dryer is used, it may be a heating regeneration-type, or may be a non-heating regeneration-type, or may be a non-regeneration-type.

It should be noted that in view of decreasing residual monomers, it is preferable that dew point of the gas when drying, in particular dew point of hot air is 30 to 100° C., still more 40 to 70° C. That is, in the present application, by setting at high dew point when drying, and setting at extremely low dew point of equal to or lower than −5° C. during transportation, the water-absorbing resin with high property is obtained.

That is, in the production step of the water-absorbing resin, difference of dew point is equal to or higher than 35° C., preferably in a range of 35 to 170° C., and more preferably 55 to 120° C.

(Temperature of the Powder Substance)

In the present invention, temperature of the water-absorbing resin powder substance (the particulate water-absorbing agent) to be supplied to the transportation pipeline is preferably equal to or higher than 30° C., more preferably equal to or higher than 40° C., and still more preferably equal to or higher than 50° C. By maintaining temperature of the water-absorbing resin powder substance (the particulate water-absorbing agent) to be supplied to the transportation pipeline at equal to or higher than predetermined temperature, property decrease of the particulate water-absorbing agent can be suppressed. Specifically, it has significant effect on maintaining property such as normal saline flow conductivity (SFC) or the like.

Temperature of the water-absorbing resin powder substance (the particulate water-absorbing agent) to be supplied to the transportation pipeline can be determined by measuring the temperature of the water-absorbing resin powder substance (the particulate water-absorbing agent) at the entrance of the transportation pipeline. Here, the "entrance of the transportation pipeline" means the peripheral part from which the water-absorbing resin powder substance (the particulate water-absorbing agent) enters the transportation pipeline for pneumatic transportation. The upper limit of the temperature of the water-absorbing resin powder substance (the particulate water-absorbing agent) is not especially limited, but, too high temperature of the water-absorbing resin powder substance (the particulate water-absorbing agent) could decrease property as the particulate water-absorbing agent. In addition, it requires a large amount of energy to maintain temperature of the water-absorbing resin powder substance (the particulate water-absorbing agent) at high temperature. From these viewpoints, temperature of the water-absorbing resin powder substance (the particulate water-absorbing agent) to be supplied to the transportation pipeline is preferably equal to or lower than 100° C., still more equal to or lower than 95° C., and particularly preferably equal to or lower than 90° C. In addition, temperature of the water-absorbing resin powder substance (the particulate water-absorbing agent) at the exit of the transportation pipeline is equal to or higher than 30° C., preferably equal to or higher than 40° C., and more preferably equal to or higher than 50° C.

A method for controlling temperature of the water-absorbing resin powder substance during transportation is not limited. Preferably, a means for heating the storage part (a storage apparatus) such as a hopper or the transportation pipeline from outside may be used. Preferably, the storage part (a storage apparatus) and/or the transportation pipeline is steam-traced. For example, by arranging a copper pipe at the exterior surface of storage part (a storage apparatus) and/or the transportation, and making steam pass inside this copper pipe, temperature of the water-absorbing resin powder substance can be maintained at equal to or higher than predetermined temperature.

Preferably, this copper pipe is wound around the exterior surface of the storage part (a storage apparatus) and/or the transportation pipeline. When dew condensation is generated inside the transportation pipeline or inside the storage part (a storage apparatus), attachment of the water-absorbing resin powder substance to the surface of the transportation pipeline or aggregation of the water-absorbing resin powder substance may occur. Therefore, in view of suppressing dew condensation and suppressing the attachment to the transportation pipeline or the aggregation of the water-absorbing resin powder substance, it is particularly preferable that the transportation pipeline and/or the storage part (a storage apparatus) are heated. As a heating method, a method as described above may be adopted. It is preferable that the transportation pipeline and/or the storage part (a storage apparatus) are heated to equal to or higher than 50° C., and more preferably equal to or higher than 60° C. and it is preferable that the upper limit of heating temperature is equal to or lower than 100° C. In addition, it is preferable that the transportation pipeline is not exposed outdoors, in view of temperature control. In view of controlling temperature of the water-absorbing resin powder substance during transportation, it is preferable that the transportation pipeline is arranged indoors.

(Linear Velocity)

In the present description, "linear velocity" indicates moving velocity of the water-absorbing resin powder substance, and substantially the same as moving velocity of air. Largeness of this linear velocity is measured along a longitudinal direction of the transportation pipeline. The linear velocity is calculated, for example, by measuring air flow amount flowing in the pipeline per unit time, with a flow meter or the like, and dividing this measured value by cross-sectional area of the transportation pipeline. As shown in FIG. 2, linear velocity of the water-absorbing resin powder substance at the starting point Km of the transportation pipeline is referred to as initial linear velocity Vx. In addition, linear velocity of the water-absorbing resin powder substance at the terminal Em of the transportation pipeline is referred to as terminal linear velocity Vy. In the same transportation pipeline, linear velocity tends to increase at the nearer position to the terminal Em of the transportation pipeline. Therefore, in the same transportation pipeline, terminal linear velocity Vy is higher than initial linear velocity Vx, and usually terminal linear velocity Vy is the maximum linear velocity in the same transportation pipeline.

By decreasing the initial linear velocity Vx of the water-absorbing resin powder substance (particle), collision speed of the particles and the transportation pipeline, or collision speed of the particles themselves decreases. By low initial linear velocity Vx, damage the water-absorbing resin powder substance receives can be suppressed. In view of suppressing property decrease of the water-absorbing resin powder substance, the initial linear velocity Vx is preferably equal to or lower than 7 m/s, more preferably equal to or lower than 5 m/s, more preferably equal to or lower than 3 m/s, and more preferably equal to or lower than 2 m/s. In view of transportation efficiency, the initial linear velocity Vx is preferably equal to or higher than 0.5 m/s.

By decreasing the terminal linear velocity Vy of the water-absorbing resin powder substance (particle), collision speed of the particles and the transportation pipeline, or collision speed of the particles themselves decreases. By low terminal linear velocity Vy, damage the water-absorbing resin powder substance receives can be suppressed. In view of suppressing property decrease of the water-absorbing resin powder substance, the terminal linear velocity Vy is preferably equal to or lower than 15 m/s, more preferably equal to or lower than 13 m/s, and more preferably equal to or lower than 12 m/s. In view of transportation efficiency, the terminal linear velocity Vy is preferably equal to or higher than 7 m/s. Supply of secondary air is adjusted so that the terminal linear velocity Vy becomes preferable value.

(Diameter of the Pipeline)

Inner diameter of the pipeline is determined corresponding to production capacity, but, it is preferably about 30 mm to 300 mm, still more preferably 50 mm to 200 mm, and particularly preferably 70 mm to 160 mm.

(Length of the Pipeline)

To prevent blocking phenomenon (clogging), the longer transportation section requires the higher pressure. This high pressurization tends to increase the initial linear velocity Vx or the terminal linear velocity Vy. Therefore, the longer is the transportation section, effect of the present invention, that is being capable of suppressing the initial linear velocity Vx or the terminal linear velocity Vy, becomes the more obvious.

Figure 5:
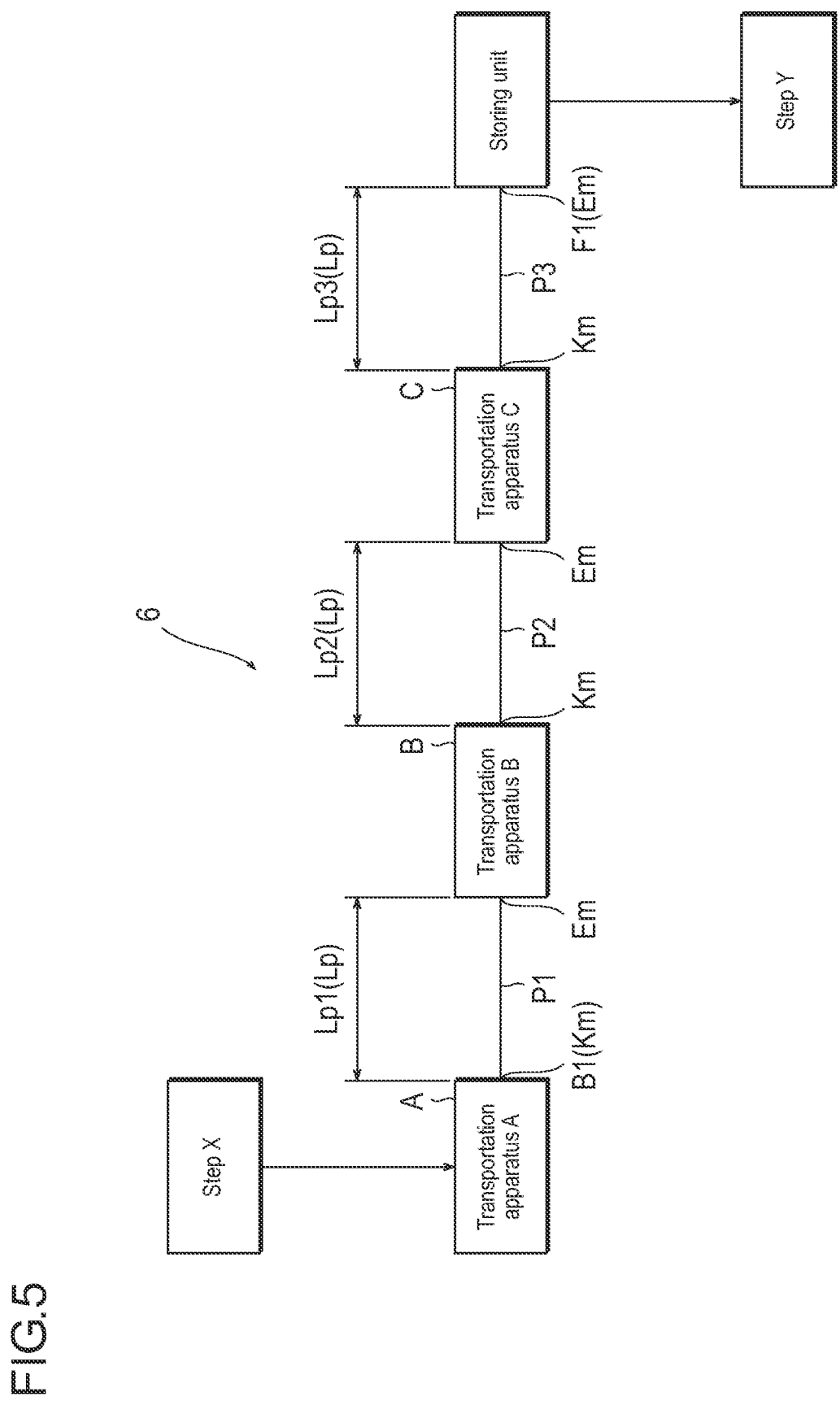
FIG. 5 is a drawing showing a schematic configuration of a transportation apparatus capable of being used in other embodiment of the present invention.

From this viewpoint, total length Lt of the transportation pipelines included in the one transportation section (from the starting point B1 of transportation section to the terminal point F1 of transportation section) is preferably equal to or longer than 50 m, and more preferably equal to or longer than 100 m. In view of preventing blocking phenomenon, or decreasing the initial linear velocity Vx or the terminal linear velocity Vy, the total length Lt is preferably equal to or shorter than 300 m. For example, in the embodiment shown in FIG. 2, the total length Lt of the transportation pipeline is equal to length of the transportation pipeline 34. In addition, in the embodiment of multi-stage pneumatic transportation to be described later such as shown in FIG. 5, the total length Lt is total of length Lp1 of the transportation pipeline P1, length Lp2 of the transportation pipeline P2, and length Lp3 of the transportation pipeline P3. That is, it is expressed as follows:

$$Lt=Lp1+Lp2+Lp3 \qquad \text{[Expression 2]}$$

In view of reducing the terminal linear velocity Vy and suppressing blocking phenomenon, each length Lp of the transportation pipelines is preferably equal to or shorter than 500 m, more preferably equal to or shorter than 200 m, and more preferably equal to or shorter than 150 m. In view of increasing design freedom of production apparatus layout, the length Lp, is preferably equal to or longer than 10 m, more preferably equal to or longer than 15 m, still more preferably equal to or longer than 20 m, and particularly preferably equal to or longer than 30 m.

The above problem of transportation efficiency or property decrease or the like tends to become obvious in production in an industrial scale. From this point of view, in the transportation method of the present invention, it is preferable that transportation capacity of the water-absorbing resin powder substance is equal to or higher than 1000 kg/hr. [kg/hr] means transportation capacity (kg) per 1 hour. In view of decreasing the initial linear velocity Vx, transportation capacity of the water-absorbing resin powder substance is preferably equal to or lower than 10000 kg/hr.

(Radius of a Curvature)

Other than installment of the transportation pipeline linearly in a horizontal direction or in a vertical direction, there may be the case where it is installed curved plane-likely, curved sterically, or in curved polygon-likely, and in this case, curvature radius of the curved part is preferably set at equal to or larger than 1 m, and still more equal to or larger than 2 m. In addition, the upper limit thereof is sufficient to be about 10 m, and still more 5 m. Number of the curved part in one transportation section is preferably set at 2 to 10 places, and more preferably 2 to 5 places.

(Production Capacity)

The above problem of transportation efficiency or property decrease or the like tends to become obvious in production in an industrial scale. From this viewpoint, in the transportation method of the present invention, it is preferable that transportation capacity of the water-absorbing resin powder substance per one line is equal to or higher than 1000 kg/hr. It should be noted that [kg/hr] means transportation capacity (kg) per 1 hour. In view of decreasing the initial linear velocity Vx and the terminal linear velocity Vy, transportation capacity of the water-absorbing resin powder substance is preferably equal to or lower than 10000 kg/hr, and preferably equal to or lower than 8000 kg/hr. It should be noted that one line indicates a series of production steps of the water-absorbing resin, and when the step branches, it is specified by treatment amount in the surface cross-linking step (one apparatus).

(Transportation Under Pressurization or Transportation Under Reduced Pressure)

Pneumatic transportation of the present invention may be transportation in a pressurized state or transportation in a reduced pressure state. Pressure to be used may be determined as appropriate, and, for example, in a range of −0.8 bar to 10 bar. In the case of transportation in a reduced pressure state, the water-absorbing resin powder substance is transported by suction force of the transportation apparatus. In this case, inside pressure of the pipeline is set lower than atmospheric pressure. Preferably, pneumatic transportation of the present invention, like an embodiment shown in FIG. 2, is set transportation in a pressurized state. In the case of transportation in a pressurized state, the water-absorbing resin powder substance is transported by high pressure generating from the transportation apparatus. In transportation in pressurized state, inside pressure of the pipeline is set higher than atmospheric pressure. By setting at a pressurized state, it becomes difficult for dust or the like to intrude inside the transportation apparatus or the pipeline. This transportation in a pressurized state contributes to reduction of foreign substances contained in the water-absorbing resin powder substance. Reduction of the foreign substances is capable of contributing to property enhancement of the water-absorbing resin powder substance.

(Pneumatic Transportation Under High Concentration)

In the present description, case where a terminal solid-gas ratio is equal to or larger than 10 (kg-resin/kg-air) is generally defined as pneumatic transportation in high concentration. Pneumatic transportation in high concentration is preferable because of being capable of suppressing the initial linear velocity Vx and the terminal linear velocity Vy, as well as suppressing property decrease of the water-absorbing resin powder substance. The "terminal solid-gas ratio" is solid-gas ratio at the terminal Em of the transportation pipeline. In addition, this "solid-gas ratio" is a value obtained from mass (kg) of the water-absorbing resin powder substance divided by mass (kg) of air, and unit thereof is (kg-resin/kg-air). Therefore, the terminal solid-gas ratio is calculated by dividing transportation capacity of the water-absorbing resin powder substance per unit time in pneumatic transportation by mass of air consumed in transportation per unit time thereof. For example, when mass of the water-absorbing resin powder substance transported in 1 minute is 100 kg, and mass of air consumed in 1 minute thereof is 10 kg, the solid-gas ratio is calculated to be 100/10=10 (kg-resin/kg-air). When mass measurement of air amount consumed is difficult, pressure and volume flow rate of air are determined by a flow meter or the like, and from theses values it may be calculated using average molecular weight of air.

(Froude Number)

Froude number is in a range of preferably 10 to 18, and still more preferably 11 to 15. A measurement method for Froude number or the like has been disclosed in WO 2007/104657 pamphlet.

(Secondary Air)

In the present invention, pneumatic transportation is possible even by primary air only, but, by using the secondary air still more, more preferable transportation can be performed. In the present description, the secondary air 41 is air supplied to the transportation pipeline 34 via the pipeline for secondary air. On the contrary, air supplied to the transportation pipeline 34 without passing via the pipeline for the secondary air is also called the primary air in the present application. The primary air includes air flowing in from the pressurized tank hopper 32 to the transportation pipeline 34, or air supplied from the compressor 38 to the transportation pipeline 34 directly.

Figure 4:
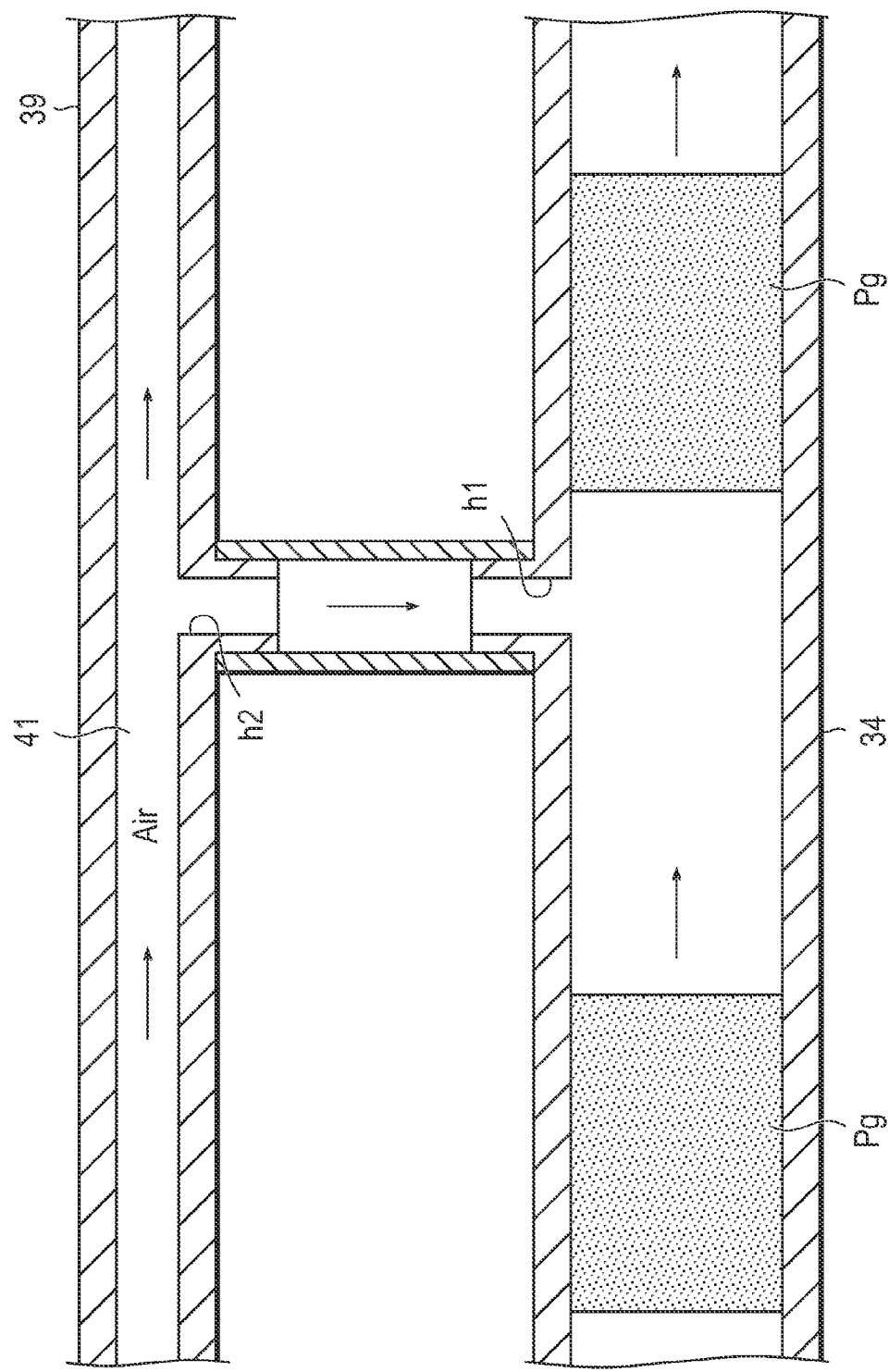
FIG. 4 is a cross-sectional view where a part of FIG. 2 is magnified.

FIG. 4 is a cross-sectional view showing the transportation pipeline 34 and the pipeline for the secondary air 39. FIG. 4 is a cross-sectional view where a part of FIG. 2 is magnified. As shown in FIG. 4, secondary air 41 is supplied from the pipeline 39 installed together at the transportation pipeline 34. The transportation pipeline 34 has an introduction hole h1 of the secondary air. At a plurality of positions in a longitudinal direction of the transportation pipeline 34, the introduction hole h1 of the secondary air is installed. The pipeline for secondary air 39 has a discharging hole h2 of the secondary air. At a plurality of positions in a longitudinal direction of the pipeline for secondary air 39, the discharging hole h2 of the secondary air is installed. The position of discharging hole h2 of the secondary air corresponds to the position of the introduction hole h1 of the secondary air. At each introduction hole h1 of the secondary air, each of the discharging hole h2 of the secondary air is connected. By this connection, secondary air is introduced from each of the introduction hole h1 of the secondary air. It should be noted that, in FIG. 4, the introduction hole h1 of the secondary air is drawn as a hole with large inner diameter, but, practically, the introduction hole of the secondary air h1 is a nozzle (air nozzle).

By secondary air introduced from the introduction hole h1 of the secondary air, the water-absorbing resin powder substance as a substance to be transported is divided. The water-absorbing resin powder substance thus divided moves inside the transportation pipeline 34 while forming a plug Pg (refer to FIG. 4). Pneumatic transportation in high concentration is defined as pneumatic transportation of the water-absorbing resin powder substance while forming the plug Pg in this way. It should be noted that, practically, it is rare that the plug Pg with regular shape as shown in FIG. 4 is maintained always during transportation. In practical pneumatic transportation in high concentration, transportation is performed while repeating a series of behaviors. This series of behaviors are as follows: a deposited layer of the powder substance is formed at the bottom of the transportation pipeline; this deposited layer grows to become a hill-like bulk; this bulk grows further to become the plug Pg; this plug Pg moves; and this plug Pg collapses.

(Variation Rate of Solid-Gas Ratio)

In the present invention, preferably still more, variation rate of a solid-gas ratio (R1/R2) is taken into consideration. It should be noted that, an initial solid-gas ratio at the starting point Km of the transportation pipeline 34 is R1 (kg-resin/kg-air) and a terminal solid-gas ratio at the terminal point Em of the transportation pipeline 34 is R2 (kg-resin/kg-air). Preferable variation rate of the solid-gas ratio in the present invention is equal to or higher than 1.

In view of increasing transportation efficiency and suppressing property decrease caused by high initial linear velocity, the initial solid-gas ratio R1 is preferably equal to or higher than 35 (kg-resin/kg-air), more preferably equal to or higher than 50 (kg-resin/kg-air), and more preferably equal to or higher than 100 (kg-resin/kg-air). In view of suppressing decrease in transportation efficiency (transportation capacity per unit hour), the initial solid-gas ratio R1 is preferably equal to or lower than 150 (kg-resin/kg-air), and more preferably equal to or lower than 120 (kg-resin/kg-air).

In view of increasing transportation efficiency, suppressing collision of particles themselves in a floating state, and suppressing property decrease, the terminal solid-gas ratio R2 is preferably equal to or higher than 10 (kg-resin/kg-air), more preferably equal to or higher than 15 (kg-resin/kg-air), and more preferably equal to or higher than 20 (kg-resin/kg-air). In view of suppressing decrease in transportation efficiency (transportation capacity per unit hour), and still more suppressing blocking phenomenon or performance decrease, the terminal solid-gas ratio R2 is preferably equal to or lower than 50 (kg-resin/kg-air), more preferably equal to or lower than 40 (kg-resin/kg-air), and more preferably equal to or lower than 30 (kg-resin/kg-air).

(Multi-Stage Pneumatic Transportation)

Pneumatic transportation may be performed in one-stage or in multi-stages.

FIG. 5 is a drawing showing a schematic configuration of multi-stage pneumatic transportation which can be used in other embodiment of the present invention. In this transportation method, the water-absorbing resin powder substance obtained in the step X is transported to an apparatus performing the step Y. The step Y is the next step of the step X. The step X is not limited, and also the step Y is not limited. In the present embodiment, a plurality of (three) pneumatic transportation apparatuses A, B and C are used in one transportation section. Transportation of the water-absorbing resin powder substance starts from the transportation apparatus A and reaches a storage part via the transportation apparatus B and the transportation apparatus C. This storage part is a storage part for supplying the water-absorbing resin powder substance to an apparatus performing the step Y. This storage part is a part of an apparatus performing the step Y.

A configuration of the transportation apparatus A is similar to that of the pneumatic transportation apparatus 30. A configuration of the transportation apparatus B is similar to that of the pneumatic transportation apparatus 30. A configuration of the transportation apparatus C is similar to that of the pneumatic transportation apparatus 30. Although not shown in FIG. 5, at the transportation pipeline P1, the pipeline for secondary air is installed together, also at the transportation pipeline P2, the pipeline for secondary air is installed together, and also at the transportation pipeline P3, the pipeline for secondary air is installed together.

The transportation apparatus A and the transportation apparatus B are connected by a transportation pipeline P1. The transportation apparatus B and the transportation apparatus C are connected by a transportation pipeline P2. The transportation apparatus C and the storage part are connected by a transportation pipeline P3. The transportation apparatus A, the transportation apparatus B and the transportation apparatus C are connected in series by the transportation pipeline. In this way, in the embodiment of FIG. 5, a plurality of the transportation apparatuses are connected in series by the transportation pipeline. Combined use of such pneumatic transportation is capable of still more suppressing property decrease after surface cross-linking, and is thus preferable.

(A Filter)

It is preferable that a filter which is capable of capturing the fine powders is installed at the receiving hopper 40. This filter is capable of capturing the fine powders present in gas in the receiving hopper. By making gas in the receiving hopper pass through the filter by suction under reduced pressure or the like, the fine powders can be captured. As this filter, a bag filter is preferable. By this filter, pneumatic transportation can be performed while attaining reduction of the fine powders. According to such an aspect, it is possible to remove the fine powders with the filter at the same time as pneumatic transportation. As the filter, a membrane filter is preferable. This membrane filter is superior in trapping efficiency. In addition, because this membrane filter is capable of shaking off the fine powders easily, clogging seldom occurs, and trapping efficiency little decreases by use. That is, one embodiment of the present invention includes a dust collection step for removing the water-absorbing resin powder substance with the filter at the same time as pneumatic transportation.

As this filter, a filter superior in trapping efficiency for JIS 12-type carbon black (particle diameter: 0.03 µm to 0.2 µm) is preferable. In view of enabling to collect the fine powders efficiently, this trapping efficiency is preferably equal to or higher than 90%, more preferably equal to or higher than 95%, still more preferably equal to or higher than 99.9%, and particularly preferably equal to or higher than 99.99%. This trapping efficiency can be measured, for example, by a method of JIS B9908:2001, type 1. In a simplified way, the trapping efficiency can be measured by use of a commercial dust meter. This trapping efficiency can be obtained substantially, based on an amount of the fine powders before passing through the filter, and the amount of the fine powders after passing through the filter. specifically, from the amount of the fine powders before passing through the filter $W0$ (mg/m$^3$), and the amount of the fine powders after passing through the filter $Wf$ (mg/m$^3$), the trapping efficiency can be calculated by the following expression. It should be noted that, as this dust meter, for example, a product name "P5L Digital Dust Meter", manufactured by Shibata Scientific Technology, Ltd. is included.

Trapping efficiency(%)=(1−$Wf/W0$)×100     [Expression 3]

[Applications of the Water-Absorbing Resin]

Applications of the water-absorbing resin (the particulate water-absorbing agent) of the present invention obtained as above is not especially limited, and, preferably it is used in absorbing articles containing absorbing bodies such as disposable diapers, sanitary napkins, incontinent pads. In particular, when it was used in high concentration diapers (those where a large amount of the water-absorbing resin is used in one piece of the diapers), where odor or coloring or the like derived from raw materials of the particulate water-absorbing agent has conventionally been a problem, in particular, when it is used at the upper layer part of the absorbing body of the absorbing articles, particularly superior performance is exerted.

Effect of the present invention is exerted when content (core concentration) of the water-absorbing resin in absorbing bodies in such absorbent articles is, for example, 30 to 100% by mass, preferably 40 to 100% by mass, more preferably 50 to 100% by mass, still more preferably 60 to 100% by mass, particularly preferably 70 to 100% by mass, and most preferably 75 to 95% by mass.

EXAMPLES

Effect of the present invention will be clarified below with reference to Examples, but, the present invention should not be construed restrictively, based on description of these Examples. It should be noted that, a measurement method for SFC or solid-gas ratio or the like in the following Examples is as described above.

Production Example 1

Production of the Water-Absorbing Resin A

A continuous production apparatus of the water-absorbing resin was used, which is capable of performing each step continuously, and is composed by being connected with the polymerization step (static polymerization on a belt), the gel grain refining (crushing) step, the drying step, the pulverization step, the classification step, the surface cross-linking step (a spray step of the surface cross-linking agent and a heating step), the cooling step, the granule sizing step, and the transportation step between each step. Production capacity of this continuous production apparatus was about 1500 kg per one hour. The water-absorbing resin was produced continuously by using this continuous production apparatus.

Firstly as a monomer aqueous solution (1) an aqueous solution containing a partial sodium salt of acrylic acid with 75% by mole neutralized was prepared. This monomer aqueous solution (1) contains polyethylene glycol diacrylate (average number of n=9), as an inner cross-linking agent, and content of this polyethylene glycol diacrylate monomer concentration was adjusted to 0.06% by mole, relative to total mole number of the monomer. In this monomer aqueous solution (1), concentration of the monomer (the partial sodium salt of acrylic acid) was set to 38% by mass. The resultant monomer aqueous solution (1) was fed continuously with a metering pump, and by blowing nitrogen gas continuously in the midst of the pipeline, oxygen concentration of this monomer aqueous solution (1) was adjusted to equal to or lower than 0.5 ppm. It should be noted that, the "average number of n" means average number of polymerization degree of a methylene chain in the polyethylene glycol chain.

Next, to the monomer aqueous solution (1), sodium persulfate and L-ascorbic acid were mixed continuously with a line mixer. In this line mixing, mixing ratio of sodium persulfate and L-ascorbic acid was set at 0.12 g/0.005 g, relative to 1 mole of the monomer. The continuous mixture obtained by this line mixing was supplied to a flat surface steel belt having weirs at both sides thereof, so that thickness thereof became about 30 mm to perform static aqueous solution polymerization continuously for 30 minutes and a hydrogel cross-linked polymer (1) was obtained. This hydrogel cross-linked polymer (1) was segmentalized to about 1 mm by using a meat chopper with a pore diameter of 7 mm, and this was spread and mounted on a moving porous plate of a continuous air-flow band dryer to a thickness of 50 mm, to be subjected to drying at 185° C. for 30 minutes, and a dried polymer was obtained. Whole mass of the relevant dried polymer was continuously supplied to a three-stage roll mill to be pulverized. Roll gap configuration of this three-stage roll mill was from the top, 1.0 mm/0.55 mm/0.42 mm. After this pulverization, it was classified by a classification apparatus having a metal mesh with a sieve mesh size of 850 µm and a metal mesh with a sieve mesh size of 150 µm to obtain the particulate water-absorbing resin (1), wherein about 98% by mass was the particles with 150 µm to 850 µm. CRC of this water-absorbing resin (1) was 35 g/g.

Still more, this particulate water-absorbing resin (1) was continuously supplied in 1500 kg/hr to a high speed continuous mixing machine (Turbulizer/1000 rpm), and the surface treatment agent solution was mixed by spraying with a sprayer. This surface treatment agent solution was a mixed solution of 1,4-butanediol, propylene glycol and pure water. This surface treatment agent solution was obtained by mixing with 1,4-butanediol of 0.3 part by mass, propylene glycol of 0.5 part by mass and pure water of 2.7 part by mass, relative to 100 parts by mass of the water-absorbing resin. Next, after the resultant mixture was subjected to heat processing continuously at 198° C. for 40 minutes with a paddle dryer (a groove-type stirring-type dryer), it was forced to cool down to 60° C. using a similar paddle dryer (the cooling step). Still more, a substance passing 850 µm was classified by using a sieving apparatus, and a product on the mesh (a substance not passing 850 µm) was pulverized again and mixed with the substance passing 850 µm, to obtain the water-absorbing resin power substance A as a granule sized product, where the whole amount was the substance passing 850 µm. It should be noted that the water-absorbing resin A had CRC/AAP/SFC=30.5 (g/g)/25.5 (g/g)/30 ($\times 10^{-7} \cdot cm^3 \cdot s \cdot g^{-1}$).

Production Example 2

Production of the Water-Absorbing Resin B

The water-absorbing resin B was obtained similarly as in Production Example 1, except that 1 part by mass of a 50% by mass aqueous solution of aluminum sulfate was added relative to 100 parts by mass of the particulate water-absorbing resin (1), in the cooling step. The water-absorbing resin B obtained in the Production Example 2 had CRC/AAP/SFC=30 (g/g)/24.5 (g/g)/50 ($\times 10^{-7} \cdot cm^3 \cdot s \cdot g^{-1}$).

Production Example 3

Production of the Particulate Water-Absorbing Resin (3)

The water-absorbing resin powder substance (the particulate water-absorbing resin) (3) having nearly the same particle size as in Production Example 1, and a CRC of 35 g/g, was obtained by performing similarly as in Production Example 1, except that, in the Production Example 1, after pulverizing with a three-stage roll mill and classifying, with a sieve classification apparatus having a metal mesh of a sieve mesh size of 850 µm and 150 µm, to obtain particles of 850 to 150 µm, recycling of the fine powders was performed by kneading about 8% by weight of the fine powders removed (substances passing through 150 µm), in accordance with JP-A-2001-079829, together with the hydrogel cross-linked polymer (2), with a meat chopper. By observation with an electron microscope, it was observed that the water-absorbing resin powder substance (3) included a granulated substance, where the fine powders are unified to particles with a particle diameter of 850 to 150 µm, and thus yield and water-absorbing speed (for example, Vortex or FSR: as for a measurement method, refer to U.S. Pat. No. 6,849,665) were enhanced due to recycling of the fine powders, as compared with the water-absorbing resin powder substance (1). It should be noted that, the recycling of the fine powders to similar water-containing gel is possible also by a continuous kneader instead of the meat chopper.

Example 1

A transportation test of the water-absorbing resin powder substance was performed using a transportation apparatus similar to the pneumatic transportation apparatus 30 shown in FIG. 2. As a transportation air source, a compressor 38 shown in FIG. 2 was used, and after dehumidification (not shown) dew point was set at −15° C. Air temperature was 35° C., and testing time was 600 seconds. As the water-absorbing resin powder substance, the water-absorbing resin A obtained in Production Example 1 was used. Inner diameter of the transportation pipeline 34 was set at 83.1 mm, and the inner surface of the transportation pipeline was subjected to buffing with a #400 paper (surface roughness Rz: 200 nm). Each of the transportation pipelines has a horizontal part and a vertical part, and length of the transportation pipeline was 104 m for the horizontal part, and 19 m for the vertical part. Therefore length Lp of the transportation pipeline and the total length Lt were 123 m. Terminal linear velocity was 11.5 m/s. Transportation capacity per unit hour was 4707 kg/hr. Temperature of the entrance of the transportation pipeline of the water-absorbing resin powder substance was 50° C., and temperature of the exit thereof was 35° C.

The water-absorbing resin powder substance after the transportation test, which reached the final point F1 of the transportation section, had a CRC of 30.5 (g/g), an SFC of 30.0 ($\times 10^{-7}\cdot cm^3 \cdot s \cdot g^{-1}$), an AAP of 25.2 (g/g), and a moisture content of 3.0% by weight. A reduction rate of SFC by transportation was 1.6%. Blocking phenomenon was not observed. It should be noted that, when SFC before transportation and SFC after transportation are expressed as Sf1 and Sf2, respectively, the reduction rate Rs of SFC can be calculated by the following expression.

$$Rs=[(Sf1-Sf2)/Sf1] \times 100 \quad \text{[Expression 4]}$$

Comparative Example 1

A transportation test of the water-absorbing resin powder substance was performed using a transportation apparatus similar to the pneumatic transportation apparatus 30 shown in FIG. 2. As a transportation air source, a Roots blower was used instead of the compressor 38 shown in FIG. 2, without dehumidification, and dew point was set at 20° C. Air temperature was 35° C., and testing time was 600 seconds. As the water-absorbing resin powder substance, the water-absorbing resin powder substance A obtained in Production Example 1 was used. Inner diameter of the transportation pipeline was set at 83.1 mm, and the inner surface of the transportation pipeline was subjected to buffing with a #400 paper (surface roughness Rz: 200 nm). Each of the transportation pipelines has a horizontal part and a vertical part, and length of the transportation pipeline was 104 m for the horizontal part, and 19 m for the vertical part. Therefore length Lp of the transportation pipeline and the total length Lt were 123 m. Terminal linear velocity was 11.5 m/s. Transportation capacity per unit hour was 4000 kg/hr. Temperature of the entrance of the transportation pipeline of the water-absorbing resin powder substance was 50° C., and temperature of the exit thereof was 35° C.

The water-absorbing resin powder substance after the transportation test, which reached the final point F1 of the transportation section, had a CRC of 30.5 (g/g), an SFC of 29.0 ($\times 10^{-7}\cdot cm^3 \cdot s \cdot g^{-1}$), an AAP of 25.0 (g/g). A reduction rate of SFC by transportation was 4.9%. Blocking phenomenon was not observed, but, transportation capability was decreased and also SFC value was decreased.

Comparative Example 2

A transportation test of the water-absorbing resin powder substance was performed using a transportation apparatus similar to the pneumatic transportation apparatus 30 shown in FIG. 2. As a transportation air source, a Roots blower was used instead of the compressor 38 shown in FIG. 2, without dehumidification, and dew point was set at 20° C. Air temperature was 35° C., and testing time was 600 seconds. As the water-absorbing resin powder substance, the water-absorbing resin power substance A obtained in Production Example 1 was used. Inner diameter of the transportation pipeline 34 was set at 83.1 mm, and the inner surface of the transportation pipeline was not finished specifically (surface roughness Rz: 1000 nm). Each of the transportation pipelines has a horizontal part and a vertical part, and length of the transportation pipeline was 104 m for the horizontal part, and 19 m for the vertical part. Therefore length Lp of the transportation pipeline and the total length Lt were 123 m. Terminal linear velocity was 11.5 m/s. Transportation capacity per unit hour was 3500 kg/hr. Temperature of the entrance of the transportation pipeline of the water-absorbing resin powder substance was 50° C., and temperature of the exit thereof was 35° C.

The water-absorbing resin powder substance after the transportation test, which reached the final point F1 of the transportation section, had a CRC of 30.5 (g/g), an SFC of 28.5 ($\times 10^{-7}\cdot cm^3 \cdot s \cdot g^{-1}$), an AAP of 24.9 (g/g). A reduction rate of SFC by transportation was 6.6%. Blocking phenomenon was not observed, but, transportation capability was decreased and also SFC value was decreased.

Example 2

A transportation test of the water-absorbing resin powder substance was performed using a transportation apparatus similar to the pneumatic transportation apparatus 30 shown in FIG. 2. As a transportation air source, a compressor 38 shown in FIG. 2 was used, and after dehumidification (not shown) dew point was set at −15° C. Air temperature was 35° C., and testing time was 600 seconds. As the water-absorbing resin powder substance, the water-absorbing resin power substance B obtained in Production Example 2 was used. Inner diameter of the transportation pipeline was set at 83.1 mm, and the inner surface of the transportation pipeline was subjected to buffing with a #400 paper (surface roughness Rz: 200 nm). Each of the transportation pipelines has a horizontal part and a vertical part, and length of the transportation pipeline was 104 m for the horizontal part, and 19 m for the vertical part. Therefore length Lp of the transportation pipeline and the total length Lt were 123 m. Terminal linear velocity was 15.0 m/s. Transportation capacity per unit hour was 4900 kg/hr. Temperature of the entrance of the transportation pipeline of the water-absorbing resin powder substance was 50° C., and temperature of the exit thereof was 35° C.

The water-absorbing resin powder substance after the transportation test, which reached the final point F1 of the transportation section, had a CRC of 30 (g/g), an SFC of 49.5 ($\times 10^{-7}\cdot cm^3 \cdot s \cdot g^{-1}$), an AAP of 24.4 (g/g), and a moisture content of 2.5% by weight. A reduction rate of SFC by transportation was 1.0%. Blocking phenomenon was not observed.

Example 3

The transportation test of the water-absorbing resin obtained in Production Example 3 was performed using similar operation as in Example 1, and transportation was able to be performed similarly as in Example 1.

Comparative Example 3

A transportation test of the water-absorbing resin powder substance was performed using a transportation apparatus similar to the pneumatic transportation apparatus 30 shown in FIG. 2. As a transportation air source, a Roots blower was used instead of the compressor 38 shown in FIG. 2, without dehumidification, and dew point was set at 20° C. Air temperature was 35° C., and testing time was 600 seconds. As the water-absorbing resin powder substance, the water-absorbing resin powder substance B obtained in Production Example 2 was used. Inner diameter of the transportation pipeline 34 was set at 83.1 mm, and the inner surface of the transportation pipeline was not finished specifically (surface roughness Rz: 1000 nm). Each of the transportation pipelines has a horizontal part and a vertical part, and length of the transportation pipeline was 104 m for the horizontal part, and 19 m for the vertical part. Therefore length Lp of the transportation pipeline and the total length Lt were 123 m. Terminal linear velocity was 15.0 m/s. Blocking phenomenon generated and it was impossible to continue the test. Inspection of the transportation pipeline by disassembly revealed an aggregated substance which firmly blocked the pipeline.

TABLE 1

Specification of Examples and Comparable Examples and Evaluation Results

|  | Example 1 | Comparable Example 1 | Comparable Example 2 | Example 2 | Comparable Example 3 |
|---|---|---|---|---|---|
| Water-absorbing resin powder substance | A | A | A | B | B |
| Terminal linear velocity (m/s) | 11.5 | 11.5 | 11.5 | 15.0 | 15.0 |
| Transportation capacity per unit hour (kg/hr) | 4700 | 4000 | 3500 | 4900 | Clogging |
| SFC after transportation ($\times 10^7 \cdot cm^3 \cdot s \cdot g^{-1}$) | 30 | 29 | 28.5 | 49.5 | — |
| Reduction rate of SFC (%) | 1.6% | 4.9% | 6.6% | 1.0% | — |

As shown in Table 1, it is understood that Examples have high evaluation (reduction rate of SFC) as compared with Comparable Examples, and are capable of preventing clogging of the pipeline. From these results, superiority of the present invention is obvious.

Industrial Applicability

The production method for a water-absorbing resin powder substance relevant to the present invention can be applied suitably in the production step of the water-absorbing resin powder substance utilized in hygiene materials containing absorbing bodies such as, for example, disposable diapers or sanitary napkins, incontinent pads.

The invention claimed is:

1. A production method for a water-absorbing resin comprising:
   a polymerization step for polymerizing an aqueous solution of an unsaturated monomer to obtain a hydrogel polymer;
   a drying step for drying the hydrogel polymer to obtain a particulate water-absorbing resin; and
   a surface cross-linking step for surface cross-linking the particulate water-absorbing resin;
   wherein comprised is a pneumatic transportation step for pneumatic transporting a water-absorbing resin powder substance generated in at least one step selected from the drying step, a pulverization step, a classification step, the surface cross-linking step, a cooling step, a granule sizing step, and a fine powder capturing step, in a pipeline with a surface roughness (Rz) of the inner surface of equal to or smaller than 800 nm, by using gas with a dew point of −5° C. to −100° C.

2. The production method according to claim 1, wherein the water-absorbing resin is a polyacrylic acid (salt)-based water-absorbing resin.

3. The production method according to claim 1, wherein the water-absorbing resin comprises a surfactant or a lubricant.

4. The production method according to claim 1, wherein the water-absorbing resin powder substance comprises a fine-powder recycled substance of the water-absorbing resin.

5. The production method according to claim 1, wherein the water-absorbing resin comprises a water-soluble polyvalent metal salt or a water-insoluble fine particle.

6. The production method according to claim 1, wherein the dew point of the gas when drying prior to the transportation step is 30° C. to 100° C.

7. The production method according to claim 1, wherein polymerization in the polymerization step is aqueous solution polymerization with a continuous belt or a continuous kneader.

8. The production method according to claim 1, wherein the water-absorbing resin powder substance satisfies at least one of absorbency against non-pressure (GV)≧25 g/g, absorbency against pressure (AAP)≧15 g/g and saline flow conductivity (SFC) for 0.69% by mass normal saline solution≧10 ($\times 10^{31\ 7} \cdot cm^3 \cdot s \cdot g^{-1}$).

9. The production method according to claim 1, comprising a dust collection step for removing the water-absorbing resin fine powder with a membrane filter at the same time as pneumatic transportation.

10. The production method according to claim 1, comprising the pneumatic transportation step after the surface cross-linking step.

11. The production method according to claim 1, comprising a step for storing the water-absorbing resin powder substance, after the pneumatic transportation step.

12. The production method according to claim 1, wherein a production capacity of the water-absorbing resin is a continuous production of equal to or higher than 1000 kg/hr.

13. The production method according to claim 1, wherein the surface cross-linking step is performed with a cross-linking agent having dehydration esterification reactivity.

14. A production method for a water-absorbing resin comprising:
   a polymerization step for polymerizing an aqueous solution of an unsaturated monomer to obtain a hydrogel polymer;
   a drying step for drying the hydrogel polymer to obtain a particulate water-absorbing resin; and
   a surface cross-linking step for surface cross-linking the particulate water-absorbing resin;
   wherein comprised is a pneumatic transportation step for pneumatic transporting a water-absorbing resin powder substance in the dried state having a solid content rate of equal to or higher than 90% by weight, in a pipeline with a surface roughness (Rz) of the inner surface of equal to or smaller than 800 nm, by using gas with a dew point of −5° C. to −100° C.

* * * * *